United States Patent
Angell et al.

(10) Patent No.: US 7,867,658 B2
(45) Date of Patent: Jan. 11, 2011

(54) IONIC LIQUIDS AND IONIC LIQUID ACIDS WITH HIGH TEMPERATURE STABILITY FOR FUEL CELL AND OTHER HIGH TEMPERATURE APPLICATIONS, METHOD OF MAKING AND CELL EMPLOYING SAME

(75) Inventors: C. Austen Angell, Mesa, AZ (US); Wu Xu, Broadview Heights, OH (US); Jean-Philippe Belieres, Chandler, AZ (US); Masahiro Yoshizawa, Tokyo (JP)

(73) Assignee: Arizona Board of Regents for and on behalf of Arizona State University, Scottsdale, AZ (US)

(*) Notice: Subject to any disclaimer, the term of this patent is extended or adjusted under 35 U.S.C. 154(b) by 1128 days.

(21) Appl. No.: 10/555,468

(22) PCT Filed: May 3, 2004

(86) PCT No.: PCT/US2004/013719
§ 371 (c)(1),
(2), (4) Date: Aug. 31, 2006

(87) PCT Pub. No.: WO2004/114445
PCT Pub. Date: Dec. 29, 2004

(65) Prior Publication Data
US 2007/0026295 A1    Feb. 1, 2007

Related U.S. Application Data

(60) Provisional application No. 60/467,796, filed on May 1, 2003, provisional application No. 60/501,626, filed on Sep. 8, 2003.

(51) Int. Cl.
*H01M 8/00* (2006.01)
*H01M 8/08* (2006.01)
(52) U.S. Cl. ...................................... 429/400; 429/498

(58) Field of Classification Search ....................... None
See application file for complete search history.

(56) References Cited

U.S. PATENT DOCUMENTS

| 5,827,602 | A  | * | 10/1998 | Koch et al. ................... 429/328 |
| 6,155,057 | A  |   | 12/2000 | Velikov et al. |
| 2002/0177039 | A1 | * | 11/2002 | Lu et al. ...................... 429/213 |
| 2003/0148162 | A1 | * | 8/2003 | Narayanan et al. ............ 429/33 |
| 2004/0033414 | A1 |   | 2/2004 | Rohrl |

FOREIGN PATENT DOCUMENTS

| JP | 2003-123791 | 4/2003 |
| JP | 2003123791 | 4/2003 |
| JP | 2004-256711 | 9/2004 |
| WO | 01-93362 | 12/2001 |
| WO | 02-063073 | 8/2002 |
| WO | WO02063073 | 8/2002 |

OTHER PUBLICATIONS

Noda et al., Bronsted Acid-Base Ionic Liquids as Proton-Conducting Nonaqueous Electrolytes, Apr. 4, 2003; American Chemical Society, pp. 4024-4031.*
Angell, C. A., "Formation of Glasses from Liquids and Biopolymers," Science, 267(5206): 1924-1935 (1995).
Angell, C. A., "Origin and Control of Low-Melting Behavior in Salts, Polysalts, Salt Solvates, and Glassformers," in Molten Salts: From Fundamentals to Applications; Proceedings of the NATO Advanced Study Institute, held in Kas, Turkey, May 4-14, 2001; Series: NATO Science Series II: Mathematics, Physics and Chemistry, vol. 52; M. Gaune-Escarde (Editor), NATO-ASI, Kluwer Academic Pub., Delft, 2002, pp. 305-320.
Angell, C. A., and E. J. Sare, "Glass-Forming Composition Regions and Glass Transition Temperatures for Aqueous Electrolyte Solutions," J. Chem. Phys. 52(3): 1058-1068 (1970).
Angell, C. A., et al., "Ionic liquids: inorganic vs. organic, protic vs. aprotic, and Coulomb control vs. van der Waals control," in *Proceedings of the International Symposium on Ionic Liquids in Honour of Marcelle Gaune-Escard* (Carry le Rouet, France, Jun. 26-28, 2003), H. A. Oye, A. Jagtoyen, Eds. (Dept. of Materials Technology, The Norwegian University of Science and Technology, Trondheim, Norway, 2003), pp. 389-398 [paper version], 12 pages [online].
Angell, C. A.,, "Fast Ion Motion in Glassy and Amorphous Materials," Solid State Ionics, 9 & 10, p. 3-16 (1983).
Barthel, J. et al., "Electrolyte solutions for technology—new aspects and approaches," Pure Appl. Chem. 71(9): 1705-1715 (1999).

Barthel, J. et al., "Non-Aqueous Electrolyte Solutions in Chemistry and Modern Technology," in *Physical and Inorganic Chemistry, Topics in Current Chemistry 111*, Berlin, Germany: Springer-Verlag, pp. 33-144 (1983).

Belieres, Jean-Philippe et al., "Ionic Liquids As Non-corrosive High Temperature Fuel Cell Electrolytes," Division O1—Advanced Materials for Fuel Cells and Batteries—Abstract #982, The Electrochemical Society, Orlando, FL, Oct. 12-16, 2003.

Bernal, J. and R.H. Fowler, "A theory of water and ionic solution, with particular reference to hydrogen and hydroxyl ions," J. Chem. Phys., 1(8): 515-548 (1933).

Berne, B. and S.A. Rice, "On the Kinetic Theory of Dense Fluids. XVI. The Ideal Ionic Melt," The Journal of Chemical Physics, 40(5): 1347-1362 (1964).

Bockris, J. O'M, and A.K.N. Reddy, (Eds.), "Conversion and Storage of Electrochemical Energy," Chapter 13 in *Modern Electrochemistry, Second Edition, Electrodics in Chemistry, Engineering, Biology, and Environmental Science*, vol. 2B, Kluwer Academic / Plenum Press, New York 1998., pp. 1789-1826.

Bockris, J. O'M, and A.K.N. Reddy, (Eds.), "Ionic Liquids," Chapter 5 in *Modern Electrochemistry, Second Edition, Modern Electrochemistry*, vol. 1, Kluwer Academic / Plenum Press, New York 1998., pp. 601-623.

Bockris, J. O'M, and A.K.N. Reddy, (Eds.), "The Electrified Interface," Chapter 6 in *Modern Electrochemistry, Second Edition, Fundamental of Electrodics*, vol. 2A, Kluwer Academic / Plenum Press, New York 1998., pp. 771-781.

Börjesson, L. and L.M. Torell, "Reorientation motion in superiomic sulfates: A Raman linewidth study," J. Chem. Phys., Rev. B. 32(4): 2471-2477 (1985).

Bowlas, C. J. et al., "Liquid-crystalline ionic liquids," Chem. Commun. pp. 1625-1626 (1996).

Boysen, D.A. et al., "Polymer Solid Acid Composite Membranes for Fuel-Cell Applications," Journal of the Electrochemical Society, 147(10), 3610-3613 (2000).

Brown, R. N. and A. C. McLaren, "On the mechanism of the thermal transformations in solid ammonium nitrate," Proceedings of the Royal Society of London 266: 329-343 (1962).

Caires, M. I. et al., "Preparation and characterization of matrices for phosphoric acid fuel cells," J. Appl. Electrochem., 27: 19-24 (1997).

Carlin, R. T. and J.S. Wilkes, "Chemistry and Speciation in Room-Temperature Chloroaluminate Molten Salts," Chaper 5 in Chemistry of Nonaqueous Solutions—Current Progress, G. Mamantov, and A. I. Popov, Eds., New York: VCH, pp. 277-306 (1994).

Cooper, E. I., and C.A. Angell, "Versatile Organic Iodide Melts and Glasses with High Mole Fractions of LiI: Glass Transition Temperature and Electrical Conductivities," Solid State Ionics, 9 & 10, 617-622 (1983).

Covington, A. K. and W. Davison, "Dissociation Constraints of Inorganic Acids and Bases," in *CRC Handbook of Chemistry and Physics*, 75$^{th}$ ed., D.R. Lide, Editor-in-chief, Boston: Chemical Rubber Co. (CRC) Press Inc. , pp. 8-43-8-55 (1994).

Davis, Jr., J.H., "Working Salts: Syntheses and Uses of Ionic Liquids Containing Functionalized Ions," Chapter 20 in *Ionic Liquids: Industrial Applications to Green Chemistry*, ACS Symposium Series 818 Rogers, R. D., Seddon, K. R., Eds. Ionic Liquids: Industrial Applications to Green Chemistry, ACS Symposium Series 818, American Chemical Society: Washington D.C., 2002, pp. 247-258.

Dean,. J.A., (Editor), "Table 5-8 pK$_a$ Values of Organic Materials in Water at 25° C" in *Lange's Handbook of Chemistry*, 13$^{th}$ ed., New York: McGraw-Hill, Inc., p. 5-18-5-60 (1985).

Evans, D. F. et al., "Micelle Formation in Ethylammonium Nitrate, a Low-Melting Fused Salt," Journal of Colloid and Interface Science 88(1): 89-96 (Jul. 1982).

Forsyth, S. A. et al., "Rapid, clean, and mild O-acetylation of alcohols and carbohydrates in an ionic liquid," Chem. Commun. pp. 714-715 (2002).

Fuller, J. et al., "The Room Temperature Ionic Liquid 1-Ethyl-3-methylimidazolium Tetrafluoroborate: Electrochemical Couples and Physical Properties," J. Electrochem. Soc. 144: 3881-3886 (1997).

Gordon, C.M., "Synthesis of Ionic Liquids," *Ionic liquids in synthesis*, Wasserscheid, P., Welston, T. Eds., Wiley-VCH Verlag GmbH & Co. KGaA, Weinheim, Germany, 2003, pp. 7-20.

Gurney, R. W., Chapter 7 in *Ionic Processes in Solution*, (McGraw-Hill (Dover Publications Inc.), New York, 1953, pp. 117-137.

Hagiwara et al., "A Highly Conductive Room Temperature Molten Fluoride; EMIF 2.3HF," J. Electrochem. Soc. 149: D1-D6 (2002).

Hirao, M. et al., "Preparation of Novel Room-Temperature Molten Salts by Neuralization of Amines," Journal of the Electrochemical Society 147(11): 4168-4172 (2000).

Holbrey, J. D. and K.R. Seddon, "The phase behaviour of 1-alkyl-3-methylimidazolium tetrafluoroborates; ionic liquids and ionic liquid crystals," J. Chem Soc., Dalton Trans. pp. 2133-2139 (1999).

Ishida, H. et al., "Self-diffusion of methylammonium cations in the high-temperature solid phase of $CH_3NH_3NO_3$," J. Chem. Soc., Faraday Trans. 2, , 81: 963-973 (1985).

Kvist, A. and A. Lundén, "Electrical Conductivity of Solid and Molten Lithium Sulfate," Z Naturforschg., 20a: 235-238 (1965).

Lee, Y. T. et al., "Molecular relaxation properties studied by Rayleigh-Brillouin scattering from aqueous solutions of ammonium nitrate salts," J. Chem. Phys. 1990, 92(6): 3283-3291 (1990).

Lu, W. et al., "Use of Ionic Liquids for π-Conjugated Polymer Electrochemical Devices," Science 297: 983-987 (Aug. 9, 2002).

Lundén, A. et al., "Phase Diagram, Electrical Conductivity, and Cation Diffusion of the System Lithium Sulfate—Zinc Sulphase," Solid State Ionics, 9 & 10, pp. 89-94 (1983).

Matsumoto, H., "The Application of Room Temperature Molten Salt with Low Viscosity to the Electrolyte for Dye-Sensitized Solar Cell," Chemistry Letters, pp. 26-27 (2001).

McLin, M. and C.A. Angell, "Contrasting Conductance/Viscosity Relations in Liquid States of Vitreous and Polymer 'Solid' Electrolytes," J. Phys. Chem .92: 2083-2086 (1988).

Neergat, M. and A.K. Shukla, "A high performance phosphoric acid fuel cell," J. Power Sources, 102: 317-321 (2001).

Noda, A. et al., "Bronsted Acid-Base Ionic Liquids as Proton-Conducting Nonaqueous Electrolytes," J. Phys. Chem. B 107: 4024-4033 (2003).

Pagni, R.M., "Ionic Liquids and Alternatives to Traditional Organic and Inorganic Solvents," *Green Industrial Applications of Ionic Liquids, Proceedings of the NATO Advanced Research Workshop on Green Industrial Applications of Ionic Liquids*, Heraklion, Crete Greece, Apr. 12-16, 2000, Rogers, R. D., Seddon, K. R., Volkov, S., Eds. Kluwer Academic Publishers, Dordrecht, Netherlands. 2002, pp. 105-127.

Papageorgiou, N. et al., "The Performance and Stability of Ambient Temperature Molten Salts for Solar Cells Applications," J. Electrochem. Soc. 143(10): 3099-3108 (1996).

Ripin, D.H.. and D.A. Evans, "pKa's of Inorganic and Oxo-Acids; pKa's of Nitrogen Acids; pKa's of CH bonds in Hydrocarbons and Carbonyl Compounds; pKa's of CH bonds of Nitrile, Heteroaromatic, and Sulfur Substituted Carbon; pKa's of CH bonds at Heteroatom Substituted Carbon & References" Chem 206, http://daecr1.harvard.edu/pKa/pKa.html), [accessed Mar. 2008], 5 pages.

Robinson, R. A. and R.H. Stokes, "Appendix 6.2," *Electrolyte Solutions*, 2$^{nd}$ edition, (London, England: Butterworths, p. 465 (1959).

Shuppert, J. W. and C.A. Angell, "NMR study of proton transfer interactions in the system pyridine +HCI (0%-95%)," The Journal of Chemical Physics 67(7): 3050-3056 (1977).

Sivaraman, A. et al., "Competitive Interaction and Glassy State Extension in Lithium Salt Solutions," J. Phys. Chem. B, 103: 4159-4163 (1999).

Sun, J. et al., "Room-Temperature Molten Salts Based on the Quaternary Ammonium Ion," J. Phys. Chem. B 102: 8858-8864 (1998).

Susan, A.B.H. et al., "Bronstead acid-base ionic liquids and their use as new materials for anhydrous proton conductors," Chem Commun, pp. 938-939, 2003.

Sutter, E. J. and C.A. Angell, "Glass Transitions in Molecular Liquids. I. Influence of Proton Transfer Processes in Hydrazine-Based Solutions," J. Phys. Chem. 75(12): 1826-1833 (1971).

Tsuda, T. et al., "A highly conductive composite electrolyte consisting of polymer and room temperature molten fluorohydrogenates," Solid State Ionics 149: 295-298 (2002).

Welton, T., "Room-Temperature Ionic Liquids. Solvents for Synthesis and Catalysis," Chem. Rev. 99: 2071-2083 (1999).

Xu, W. and C.A. Angell, "Weakly Coordinating Anions, and the Exceptional Conductivity of Their Nonaqueous Solutions," Electrochemical and Solid-State Letters 4(1): E1-E4 (2001).

Xu, W. et al., "Ionic Liquids: Ion Mobilities, Glass Temperature, and Fragilities," J. Phys. Chem. B 107: 6170-6178 (2003).

Xu, W., Angell, C. A., "Solvent-Free Electrolytes with Aqueous Solution-like Conductivities," Science, 302: 422-425 (2003).

Yoshizawa, M. , J. P. Belieres, et al. "Ionic Liquids by Proton Transfer, δPKA, and the Ionic Liquid Fuel Cell, "Ionic Liquids: Progress and Prospects (sponsored by Green Chemistry and Engineering and Separation Science and Technology Subdivisions), American Chemical Society, New York, NY, Sep. 7-11, 2003, abstract # 83.

Yoshizawa, M. et al., "Design of New Ionic Liquids by Neutralization of Imidazole Derivatives with Imide-Type Acids," Solid-State Lett. 4(6): E25-E27 (2001).

Yoshizawa, M. et al., "Ionic liquids by proton transfer: vapor pressure and conductivity, and the relevance of $\Delta pK_a$ from aqueous solutions," J. Am. Chem. Soc. 125: 15411-15419 (2003).

Bressle, R. D., "Concentrated Aqueous Electrolyte Solutions: An Approach From the Glassy State and the High Concentration Limit, I. Temperature Studies of Electrical Conductance, Fluidity and Density, II. Low Temperature Dielectric Relaxation Studies," Doctorate Thesis, Purdue University, Jan. 1972 [Abstract Only].

Sutter, E.J., Jr., Hydrogen Bonding and Proton Transfer Interactions in Hydrazine-Based Binary Liquids and Related Systems, Doctorate Thesis, Purdue University, Jan. 1970 [Abstract only].

\* cited by examiner

*Primary Examiner*—Dah-Wei D Yuan
*Assistant Examiner*—Adam A Arciero

(74) *Attorney, Agent, or Firm*—Fish & Richardson P.C.

(57) ABSTRACT

Disclosed are developments in high temperature fuel cells including ionic liquids with high temperature stability and the storage of inorganic acids as di-anion salts of low volatility. The formation of ionically conducting liquids of this type having conductivities of unprecedented magnitude for non-aqueous systems is described. The stability of the di-anion configuration is shown to play a role in the high performance of the non-corrosive proton-transfer ionic liquids as high temperature fuel cell electrolytes. Performance of simple $H_2(g)$ electrolyte/$O_2(g)$ fuel cells with the new electrolytes is described. Superior performance both at ambient temperature and temperatures up to and above 200° C. are achieved. Both neutral proton transfer salts and the acid salts with $HSO_4^-$ anions, give good results, the bisulphate case being particularly good at low temperatures and very high temperatures. The performance of all electrolytes is improved by the addition of a small amount of involatile base of $pK_a$ value intermediate between those of the acid and base that make the bulk electrolyte. The preferred case is the imidazole-doped ethylammonium hydrogensulfate which yields behavior superior in all respects to that of the industry standard phosphoric acid electrolyte.

12 Claims, 26 Drawing Sheets

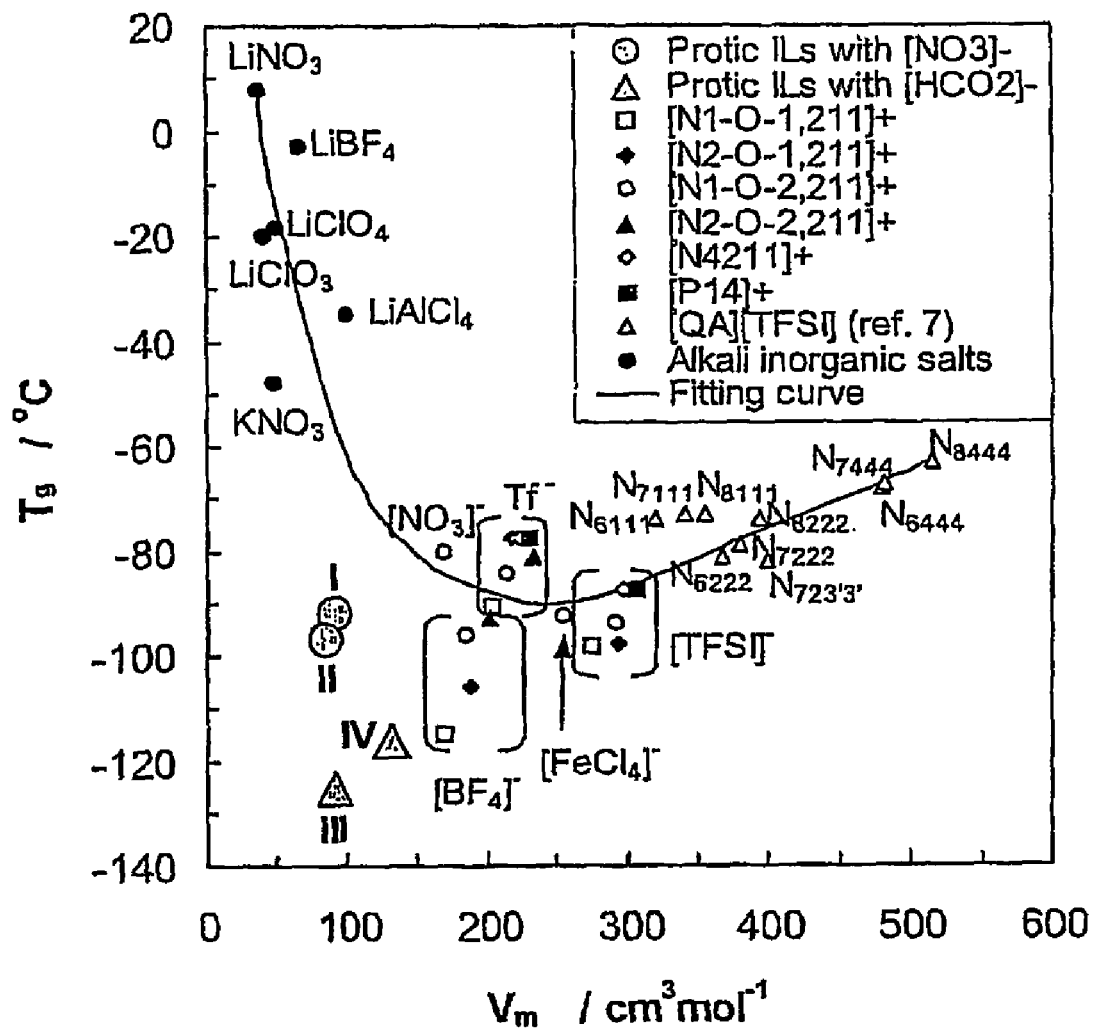
Fig. A1

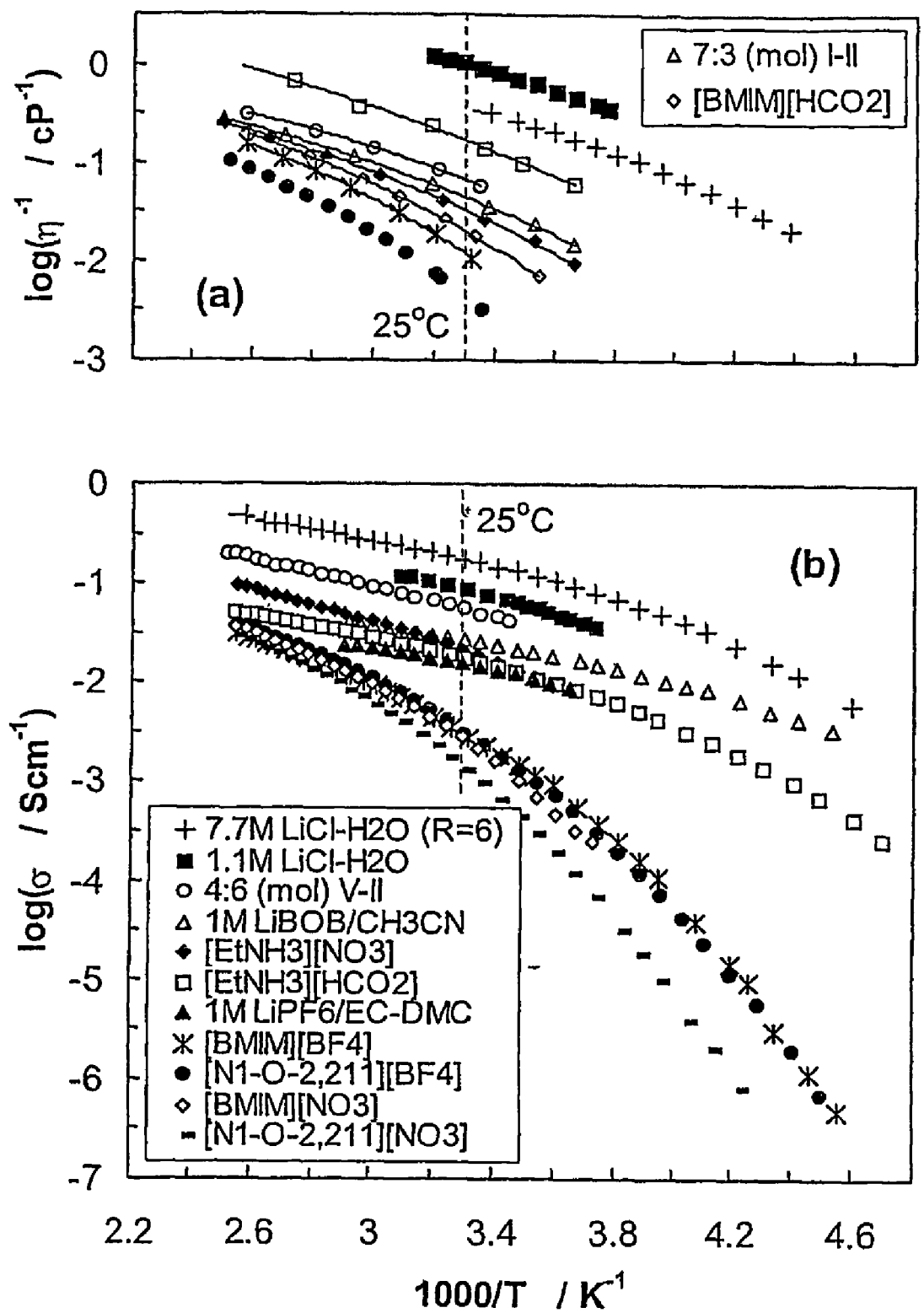
Fig. A2

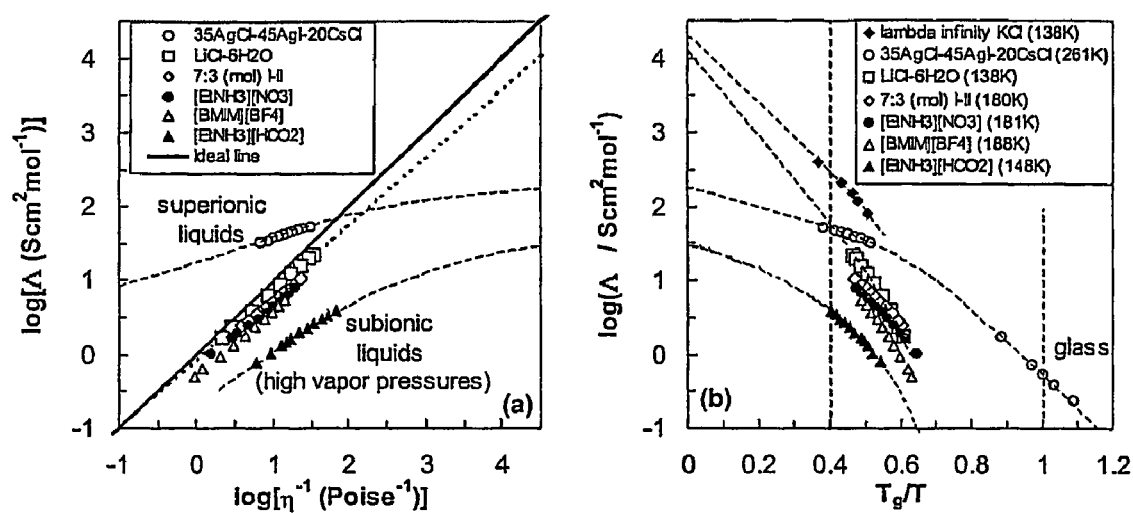
Fig. A3

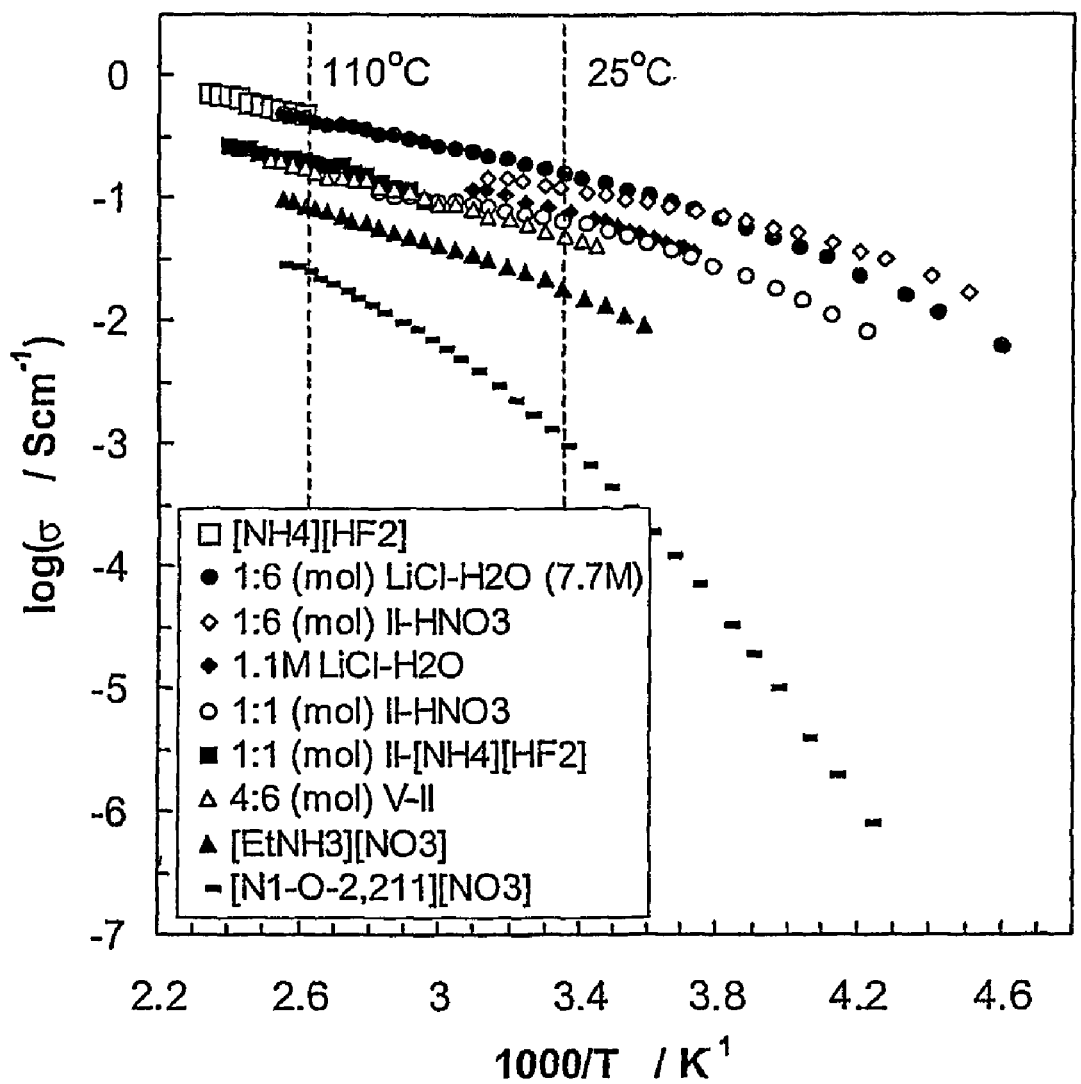
Fig. A4

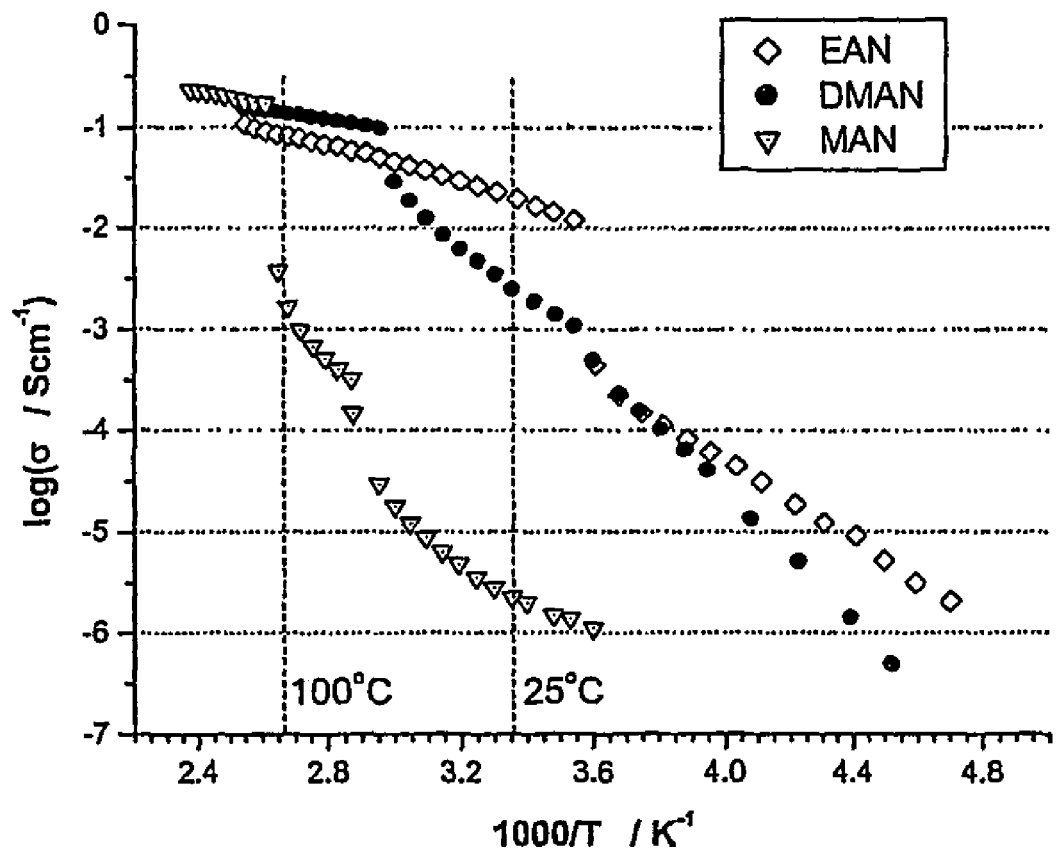
Fig. B2

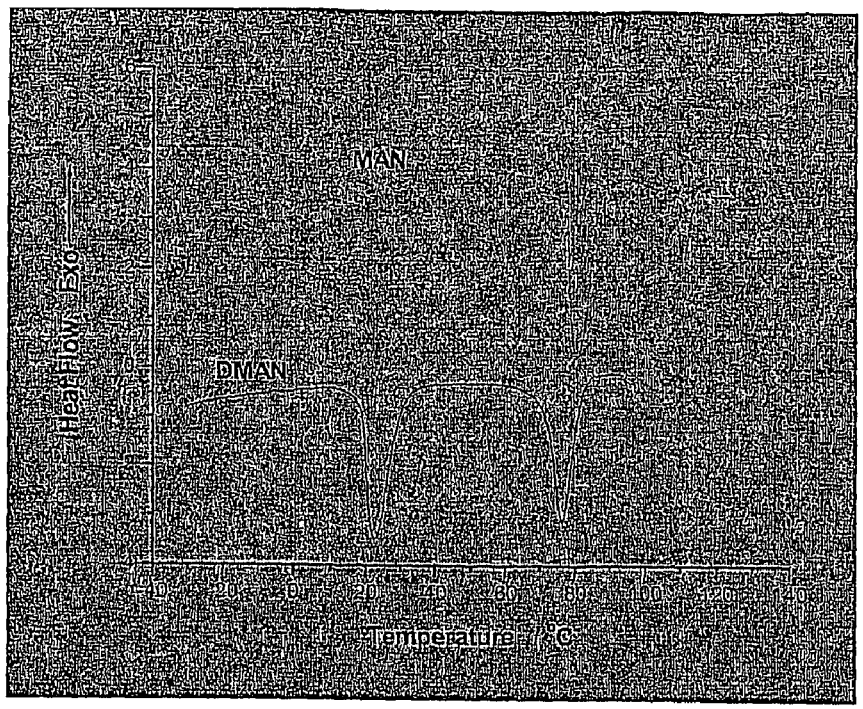
Fig. B3
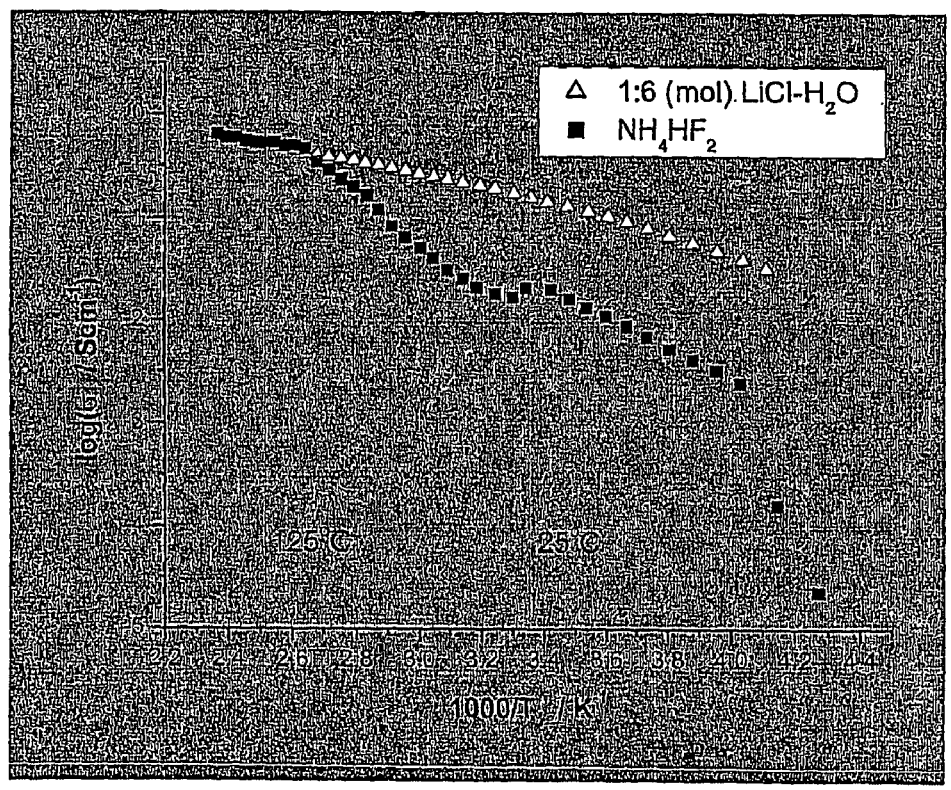
Fig. B4

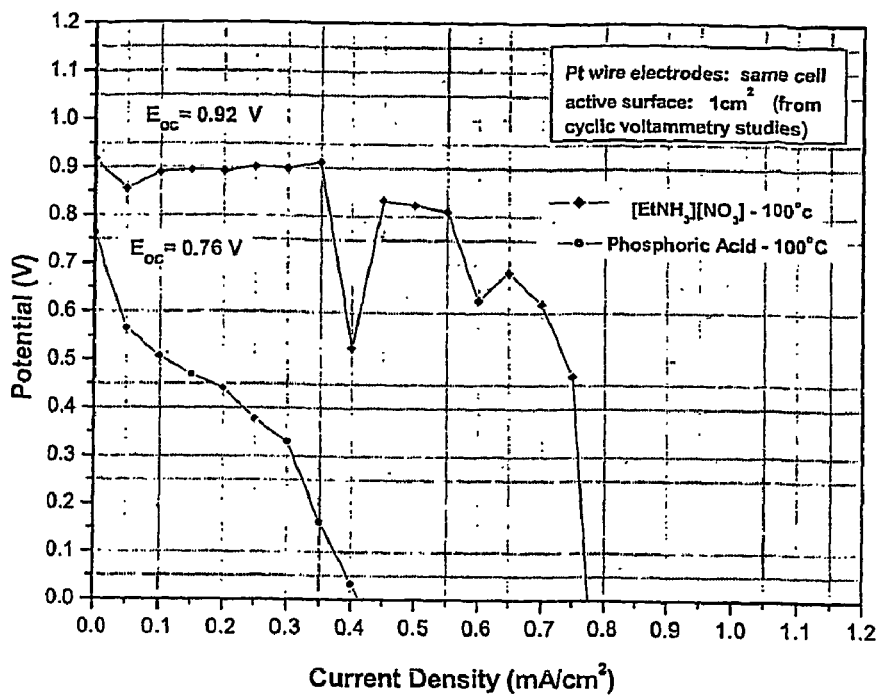
Fig. B5
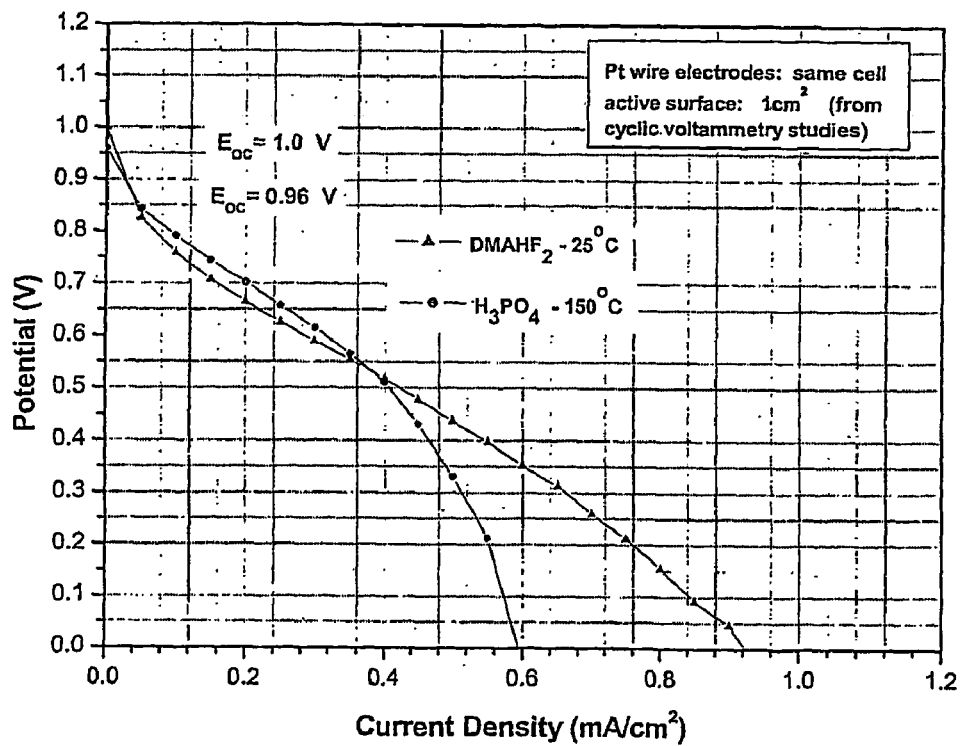
Fig. B6

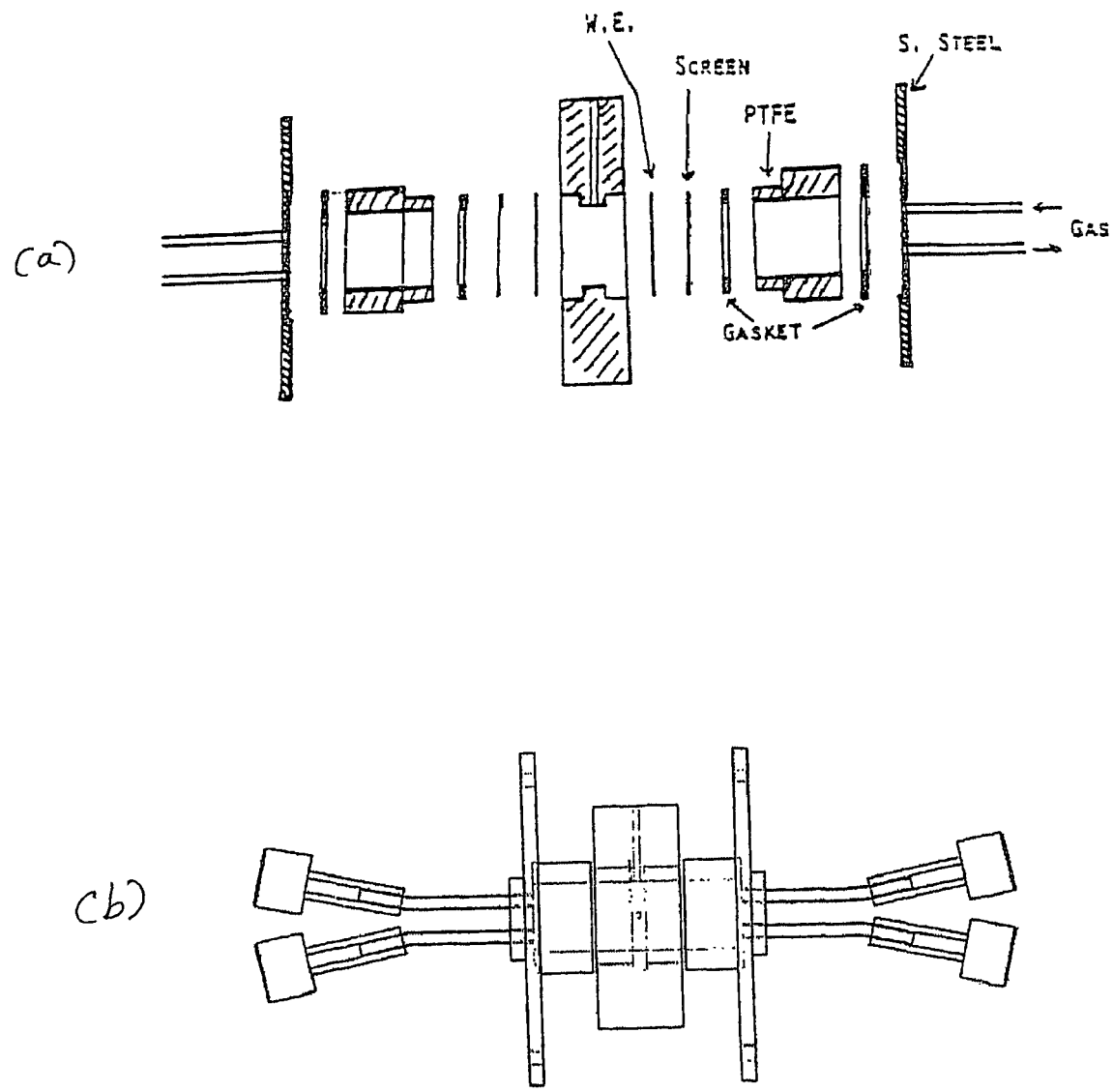
Fig. B7

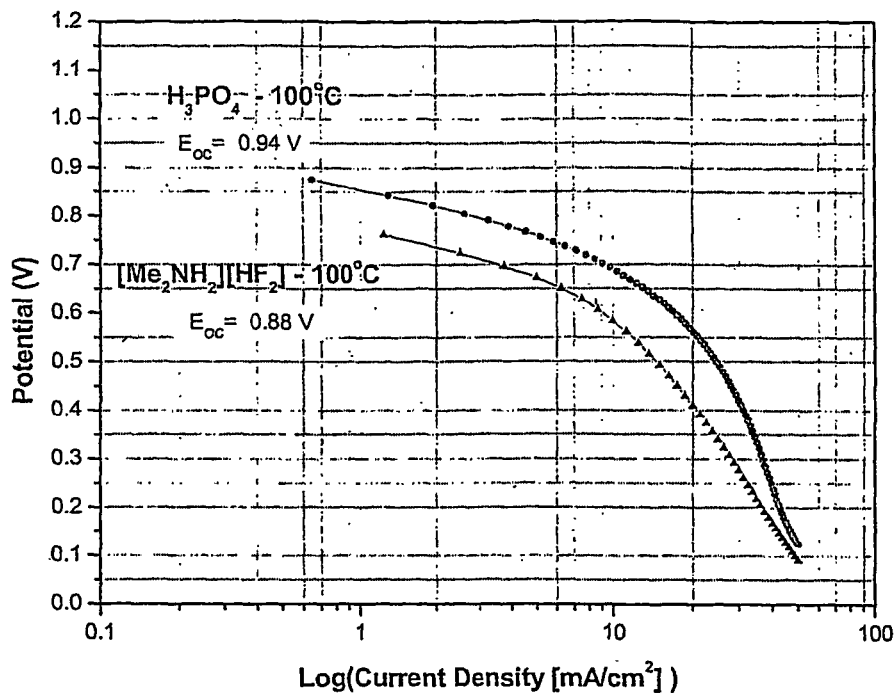
Fig. B8
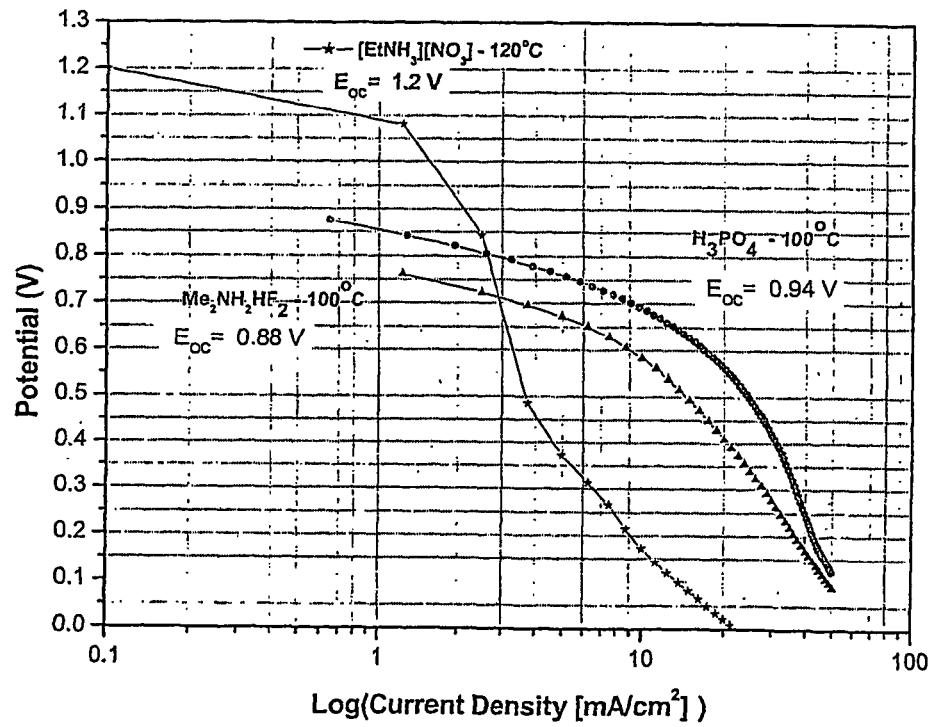
Fig. B9

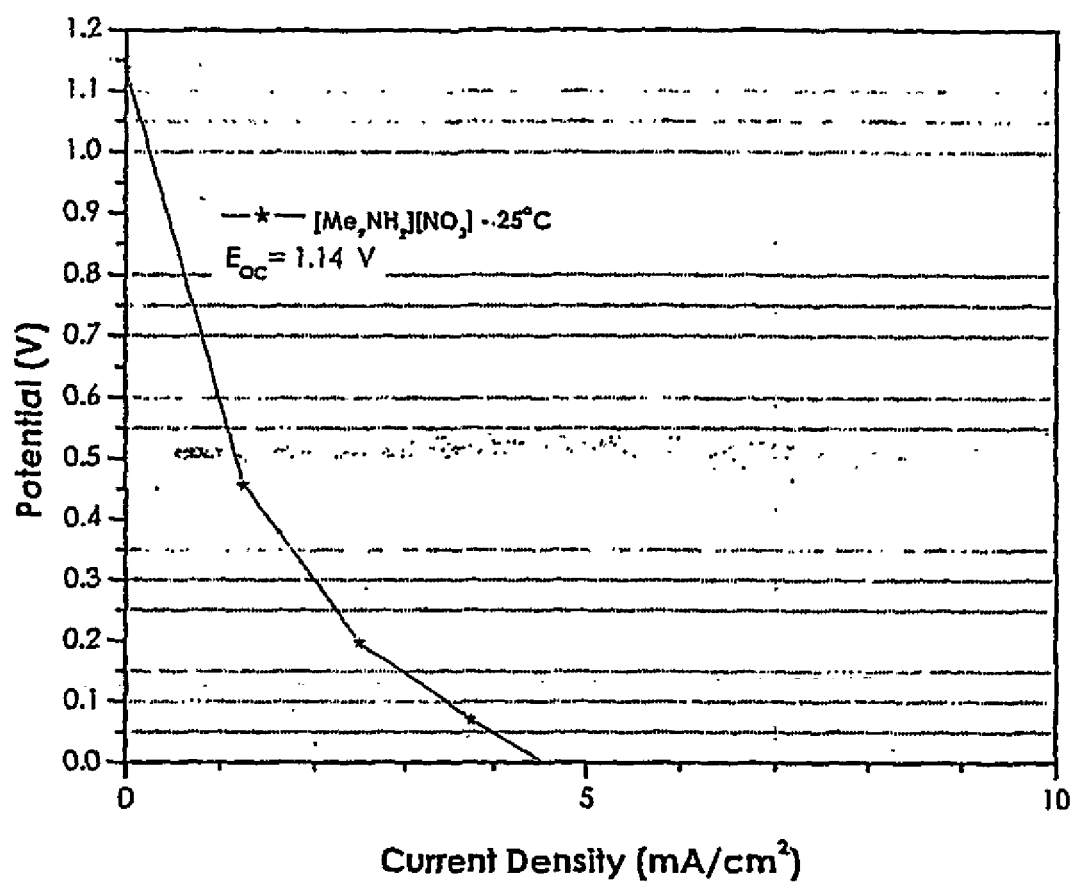
Fig. B10

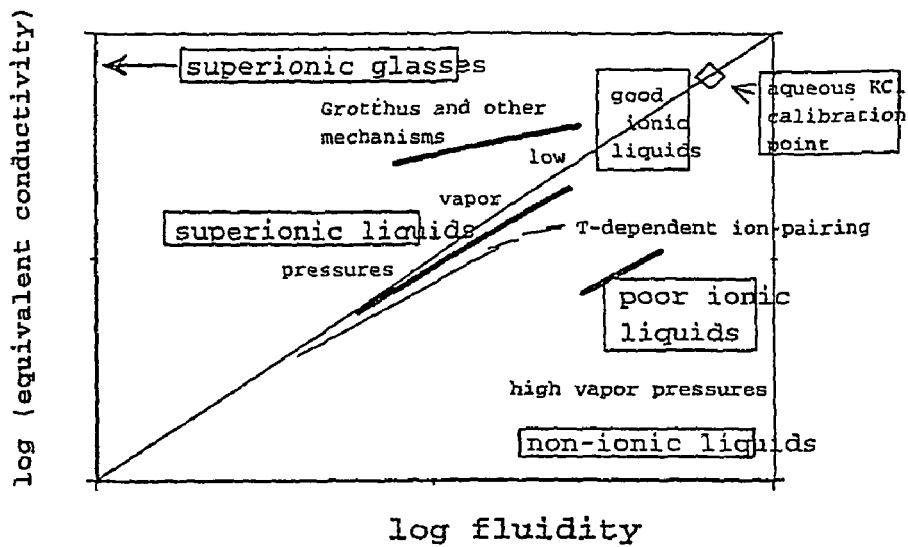
Fig C 1
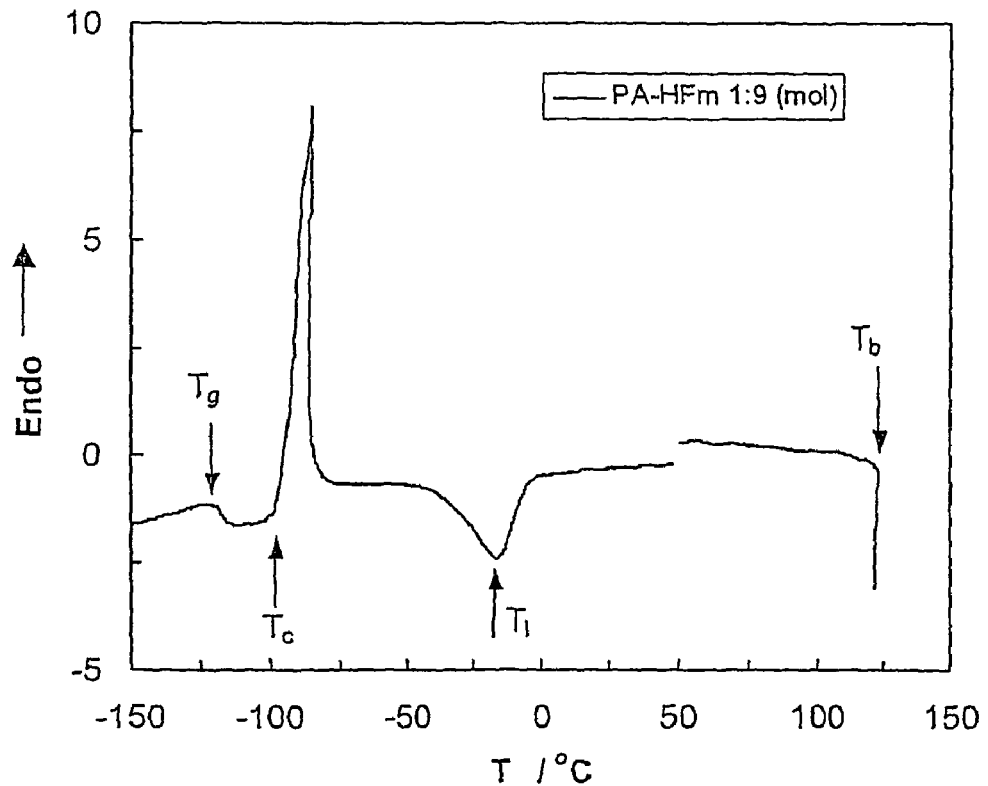
Fig. C2

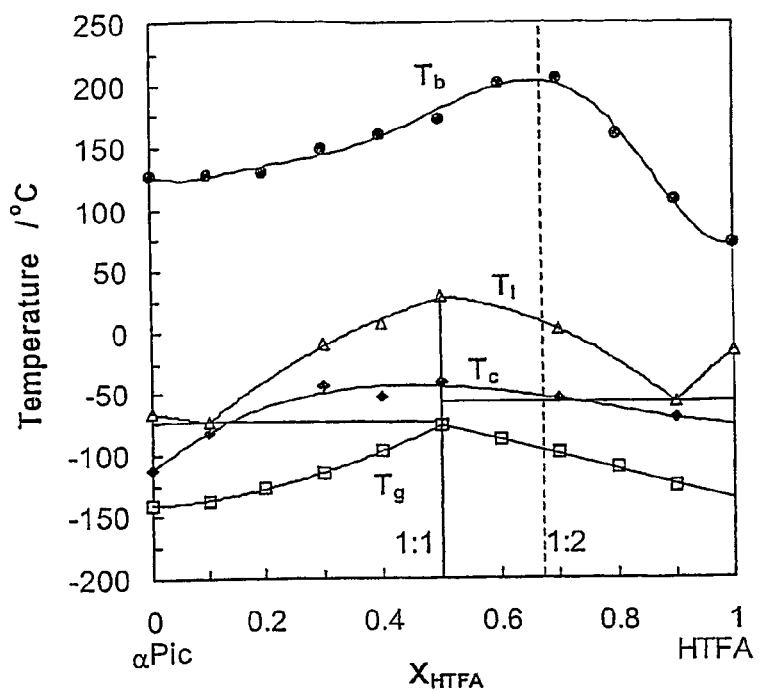
Fig. C3
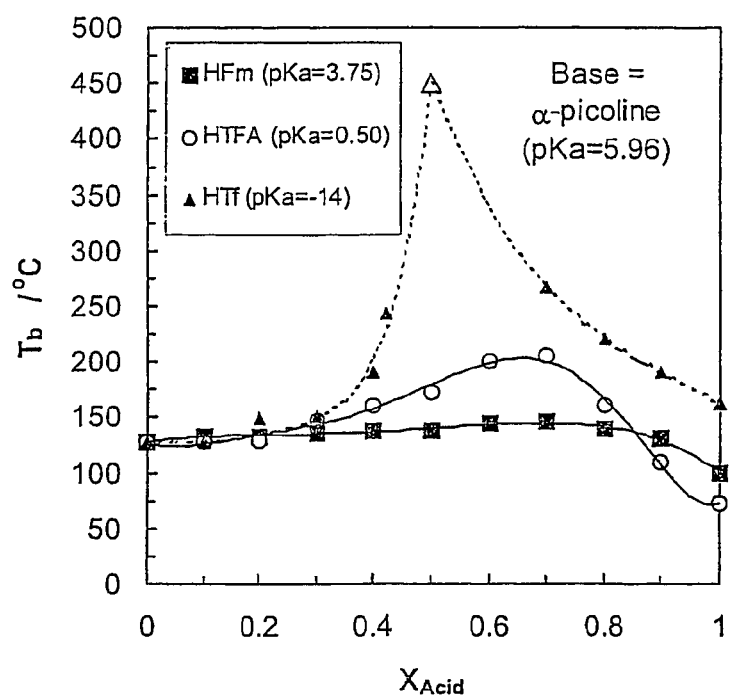
Fig. C4

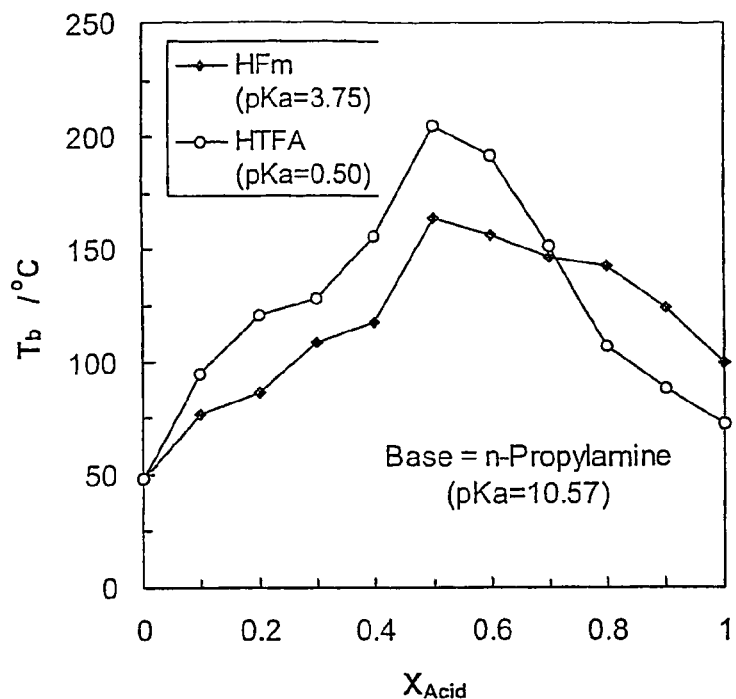
Fig. C5
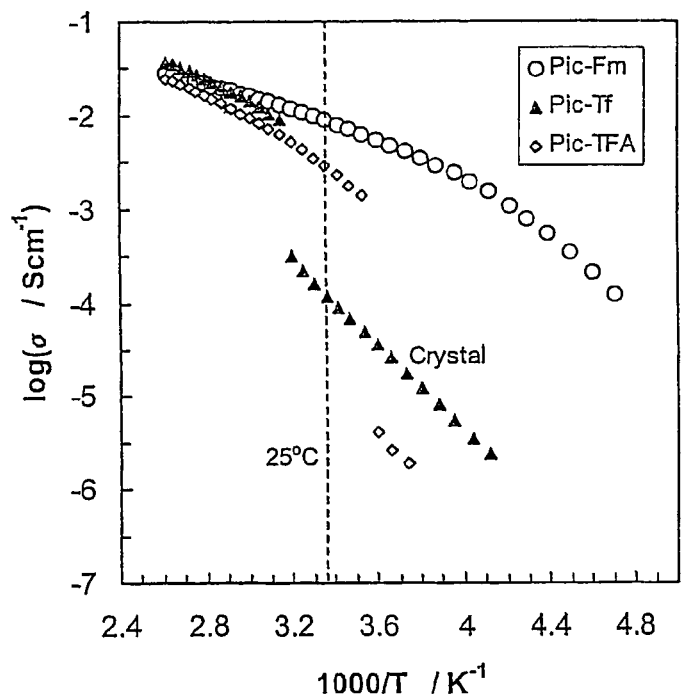
Fig. C6

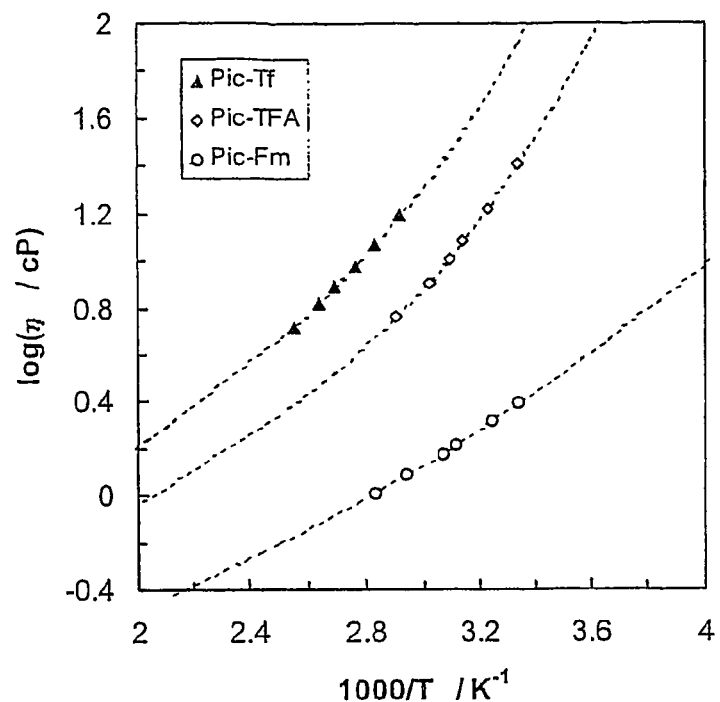
Fig. C7
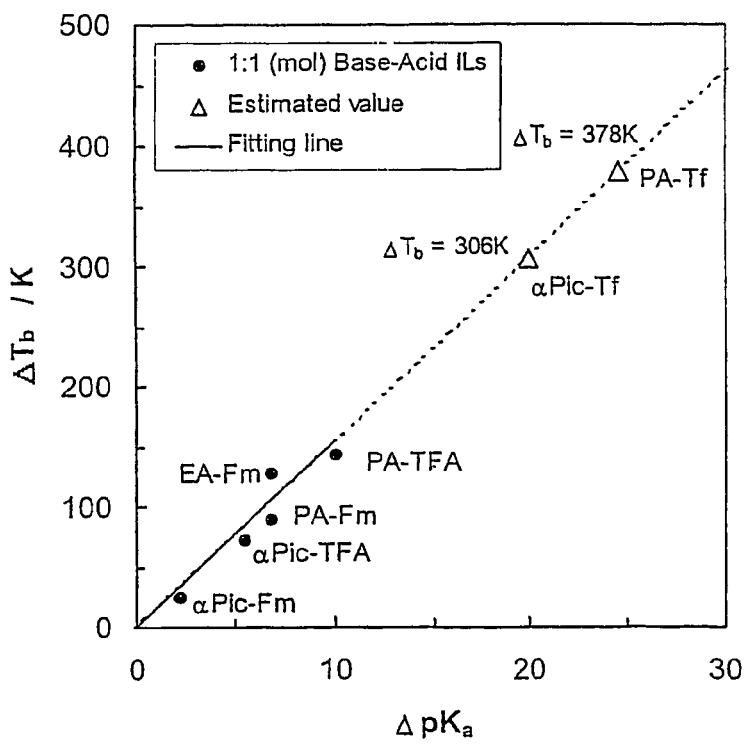
Fig. C8

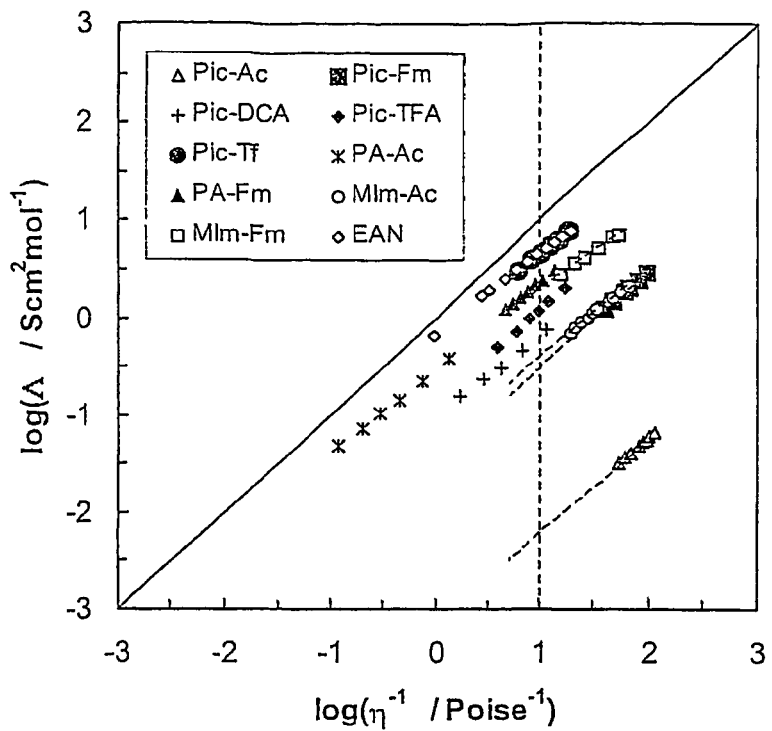
Fig. C9
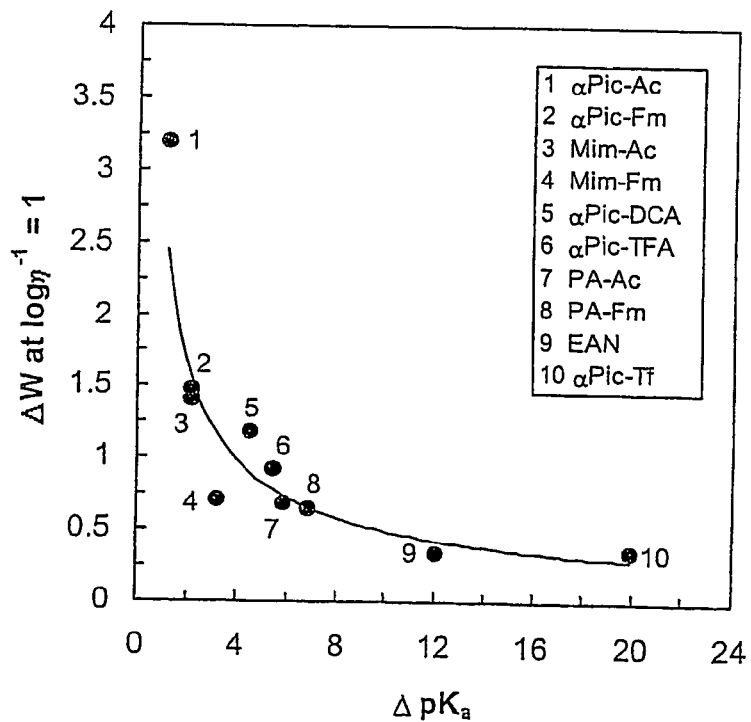
Fig. C10

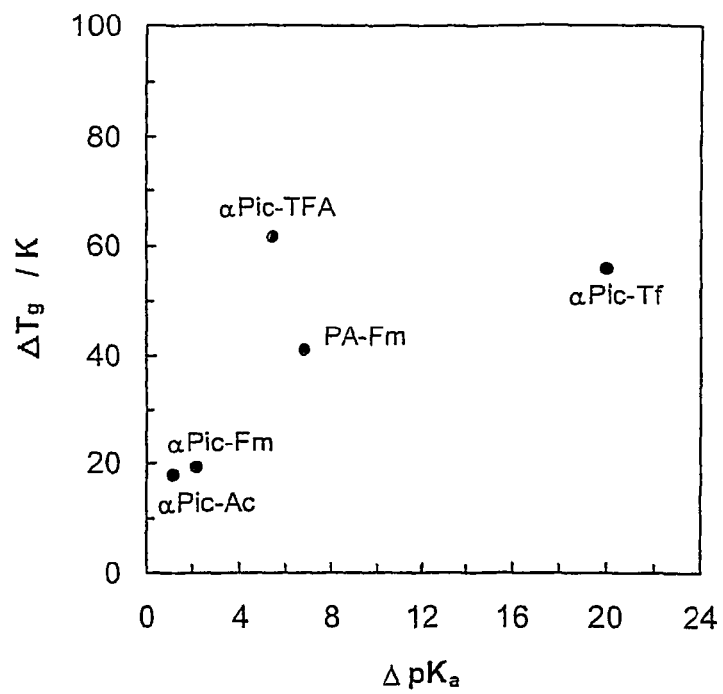
Fig. C11
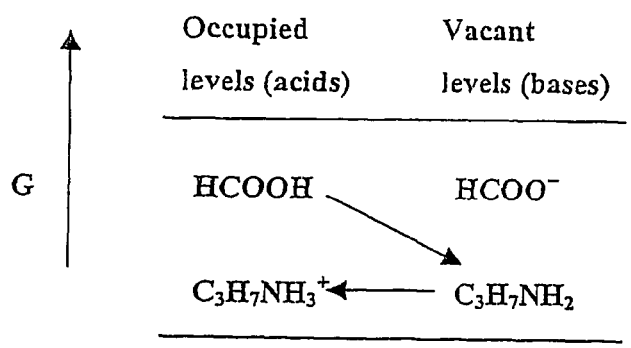
Fig. C12

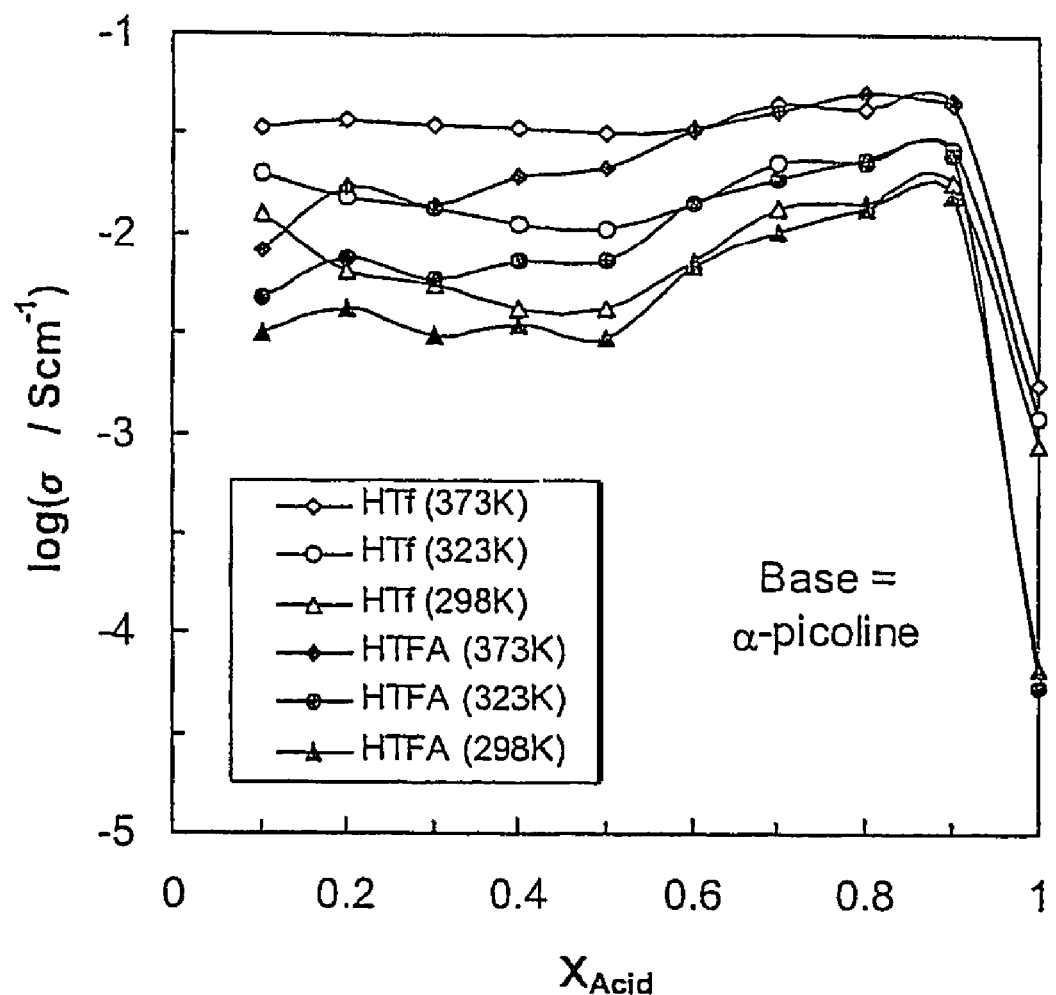
Fig. C13

IONIC LIQUIDS AND IONIC LIQUID ACIDS WITH HIGH TEMPERATURE STABILITY FOR FUEL CELL AND OTHER HIGH TEMPERATURE APPLICATIONS, METHOD OF MAKING AND CELL EMPLOYING SAME

CROSS REFERENCE TO RELATED APPLICATIONS

This application is a national stage application of and claims the benefit of PCT Application No. PCT/US2004/013719, filed on May 3, 2004, and published as WO 2004/114445, which claims priority to U.S. provisional patent application Ser. No. 60/467,796 filed May 1, 2003 entitled "Ionic Liquids and Ionic Liquid Acids with High Temperature Stability, for Fuel Cell and Other High Temperature Applications" of Angell, Xu and Belieres, and Ser. No. 60/501,626 filed Sep. 8, 2003 having the same title and the same inventors. The disclosure of the prior applications is considered part of (and is incorporated by reference in) the disclosure of this application.

STATEMENT OF GOVERNMENT FUNDING

This invention was made with government support under Grant No. W7405-ENG-36 awarded by the U.S. Department of Energy and Solid State Chemistry Grant No. DMR-9108028002 awarded by the National Science Foundation. The government has certain rights in the invention.

BACKGROUND

There is currently a great surge of activity in fuel cell research as laboratories across the world seek to take advantage of the energy capacity provided by fuel cells over those of other portable electrochemical power systems. Much of this activity is aimed at high temperature fuel cells and a vital component of such fuel cells must be availability of a high temperature stable proton-permeable membrane. Many groups are exploring high temperature stable polymers for use with systems containing non-volatile bases, e.g. imidizole which becomes the proton carrier. It can be rendered immobile (though locally mobile) by attaching it to a polymer chain and then the proton alone can permeate (though immobility is not essential for membrane function.

Other approaches to the high temperature fuel cell involve the use of single-component or almost-single-component electrolytes that provide a path for protons through the cell. A heavily researched case is the phosphoric acid fuel cell in which the electrolyte is almost pure phosphoric acid and the cathode reaction produces water directly (whereas the cathode reaction in the Bacon cell produces $OH^-$ species). The phosphoric acid fuel cell delivers an open circuit voltage of 0.9V at ambient pressure falling to about 0.7 under operating conditions at 170° C. The proton transport mechanism is mainly vehicular in character meaning that the protons are transported as an integral part of a protonated species rather than by a Grotthus type mechanism.

The study of electrical conductance in ionic solutions goes back to the earliest chapters of physical chemistry. It has been overwhelmingly the study of aqueous solutions. The concepts of ionic dissociation and the battles fought to establish the reality of ions were based on observations made on aqueous solutions (1).

The first ionic liquid IL (or ambient temperature molten salt ATMS) reported was ethylammonium nitrate in 1914 [16].

The more recent surge of interest in non-aqueous electrolyte systems (2, 3) has been driven, in part, by the quest for a rechargeable lithium battery. In this respect, the much lower conductivities characteristic of non-aqueous electrolytes has been a serious hurdle (3).

The possibility of obtaining liquids with low vapor pressures by the proton transfer mechanism has been utilized in military programs for some time [29, 30]. In these applications the combination of oxidizing anions with reducing cations in mobile liquids such as hydroxylammonium nitrate (HAN)) containing small, controlled amounts of water) makes possible the controlled redox energy release appropriate for artillery propellants. The ionic liquids formed in these systems seem to have low viscosities, judging by military report data [30] for the partially hydrated practical formulations (that have been included in certain journal publications [31] but no reports of viscosity or conductivity values for the anhydrous ionic liquids have been found.

More recently ionic liquid media have been finding application in various synthetic chemistry processes [32-35] but the great majority of such vaporless liquids have not been of the type described here. On the other hand, the proton transfer from strong acid to base has been utilized recently as a general preparative technique for formation of ionic liquids. Examples reported have had in common the very weakly basic anion bis(trifluoromethanesulfonyl)imide, TFSI [10, 36]. The relation between the protic and aprotic versions of the ionic liquid and in particular the relation between their relative vapor pressures awaits systematic attention.

When the free energy change in the proton transfer process is large the proton may become so firmly localized on the Bronsted base that the Boltzmann probability of reforming an acid molecule becomes negligible at ambient temperatures. In some cases it remains negligible even at temperatures as high as 300K. The salt is then, by most measures, as true a salt as those called "aprotic" ionic liquids (e.g. those formed by —$CH_3^+$ transfer rather than proton transfer to the same site). One will see that in fact such liquids can be more ideally ionic than certain individual salts in which there are no such proton transfer sites and in which, accordingly, the positive charge is located in the interior of the ion.

One way of assessing the ionicity of ionic liquids is to use the classification diagram shown in FIG. C1 [14, 37] which is based on the classical Walden rule [21]. The Walden rule relates the ionic mobilities (represented by the equivalent conductivity $\Lambda$ ($\Lambda=F\Sigma\mu_i z_i$) to the fluidity of the medium through which the ions move. If the liquid can be well represented as an ensemble of independent ions then the Walden plot will correspond closely with the ideal line. Ideally, which means in the absence of any ion-ion interactions, the slope should be unity. The position of the ideal line is established using aqueous KCl solutions at high dilution.

As argued elsewhere {14, 37, 38] a liquid system in which the ions are uniformly distributed with respect to ions of the opposite charge develops a Madelung energy comparable to that of the corresponding crystal. This is demonstrated by the absence of anything unusual about the heats and entropies of fusion of classical ionic systems as would be the case if the Madelung energy were lost on fusion. The vapor pressure of the "good" ionic liquid is then necessarily very low because the Madelung energy as well as the dipole-dipole interaction between ion pairs must be overcome before an ion pair can pass into the vapor state.

Salts formed by proton transfers that are weak will not form liquids with uniform charge distributions hence their Walden plots will fall below the ideal line and their vapor pressures will not be very low. In such cases, the boiling that must occur when the total vapor pressure reaches the external pressure will fall below decomposition temperatures and the vapor will tend to contain molecular species rather than ion pairs. In this work the inventors provide experimental data on a number of binary, solvent-free, Bronsted acid-base systems that will help test these notions.

Not only does presentation of data in the FIG. C1 form allow one to detect the existence of different forms of association of cations with anions, but it also serves to display the presence of abnormally high mobilities of one or other of the charge-carrying species. Excess mobility on the part of protons is a classical subject, and mechanisms that permit its understanding date from the original work of Grotthus, as invoked by Bernal and Fowler [23]. Not so commonly discussed but phenomenologically indistinguishable is the excess conductivity which is found when species that are much larger than protons can slip through the structure via channels that present lower energy barriers than those characterizing the viscous flow process. For these the motion is described by the "fractional Walden rule" $\Lambda\phi^\alpha$=constant where $\alpha<1$.

In the log-log plot of FIG. C1, data for systems featuring this sort of "decoupling" [22] appear as straight line of slope $\alpha$. In the case of solutions of strong mineral acid in aqueous protic solvents this decoupling appears to commence at a higher fluidity than in the case of silver ions in liquid halides [39, 40]. In less well-known cases such as mineral acids in glycerol the departure occurs at lower fluidities. There is need for additional empirical information on this decoupling phenomenon. The identification of conditions needed for decoupled proton motion in solvent-free systems is very desirable.

The ability of solutions to carry current measured in $\text{Sem}^{-1}$, increases with increasing ion concentration from the low and often immeasurable values of the pure solvent. However it always peaks at concentrations of the order 1M (vs. ~5M for aqueous)(2) because the electrostatic interaction between the ions of opposite charge moderated by the dielectric constant of the solvent causes a counterbalancing decrease in the individual ionic mobilities. For this reason it is generally not expected that pure salts can be excellent conductors unless the temperature is raised to high values. The inventors show that this expectation is not valid and identify conditions under which the conductivity of solvent-free ionic liquids can be raised to aqueous solution levels.

SUMMARY

In accordance with this invention ionic liquids with high temperature stability are provided as are fuel cells formed using the same. This invention also provides the method of formation of ionically conducting liquids of this type that have conductivities of unprecedented magnitude for non-aqueous systems. Another aspect of this invention is the ability to store inorganic acids as di-anion salts of low volatility. The stability of the di-anion configuration can play a role in the high performance of the non-corrosive proton-transfer ionic liquids as high temperature fuel cell electrolytes. Cell performance data shows that the opening circuit voltage output and short circuit current performance of simple $H_2(g)$/electrolyte/$O_2(g)$ fuel cell using the electrolytes of this invention may be superior to those of the equivalent phosphoric acid electrolyte fuel cell both at ambient temperature and temperatures up to and above 200° C. Both neutral proton transfer salts and the acid salts with $HSO_4^-$ and $H_2PO_4^-$ anions give good results, the bisulphate case being particularly good at low temperatures and very high temperatures.

The performance of all of these electrolytes is remarkably improved by the addition of a small amount of involatile base of $pK_3$ value intermediate between those of the acid and base that make up the bulk electrolyte. A preferred exemplary embodiment of the invention is an imidazole-doped ethylammonium hydrogensulfate, which yields behavior superior in all respects to that of the industry standard phosphoric acid electrolyte.

In accordance with one aspect of the invention, a different approach to high temperature transport of protons is provided. A vehicular mechanism of a different type in which the protons is carried by both anions and cations. Since neither anions nor cations can be deposited, the membrane is again effectively a proton-permeable membrane. In the most favorable case, the electrolyte is a stoichiometric substance and so it is not subject to polarization effects. Variants on the single component electrolyte may be subject to some polarization effects that must be minimized by high diffusion rates in the electrolyte. In any case, the polarization problem is not necessarily serious. It is encountered in all current lithium ion cells where it appears not to be a major problem. The cathode reaction using our electrolyte is believed to be:

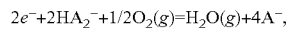

where A is an anion and the di-anion is hydrogen-bonded. However, the di-anion need not be formally present in high concentrations for the cathode process to occur because the di-anion is self-generated in the electrolyte as shown below. During the process of power generation there must be a flux of di-anions through the cell.

Because of the high temperature at which this cell is expected to operate, the water will be produced in the metastable liquid state and should immediately distill off at the cathode by saturating the incoming oxygen and creating a gaseous diffusion gradient to the cell exterior.

The proton-carrying liquids of this invention are stable against ebullition up to 200° C. in a number of embodiments and to above 250° C. in others. The proton is available for chemical transfer at rates that are demonstrated to be sufficient for application. Where necessary these may be enhanced by different catalytic approaches. Specific, preferred embodiments of electrolytes and their acid variants are described below. The performance of a simple hydrogen-oxygen fuel cell embodiment utilizing alternative examples of these high temperature stable liquids as the cell electrolyte is also described.

For specific embodiments the inventors report data on the fuel cells when studied under load. This test provides a more stringent assessment of performance than do the measurements of open circuit voltage (no load) and short circuit current (no bias voltage) also described. The results of the latter, while very suggestive of the possibilities of a new system, can also be deceptive concerning the detailed performance of cells.

The tests of the cells under load depend on the availability of more sophisticated instrumentation, by means of which a bias voltage opposing the cell voltage can be applied during measurement. In this manner one can measure the output of the fuel cell while it is working under different loads, i.e. during flow of current rather than solely under open circuit conditions. These data are presented in the form of cell voltage vs. cell current plots. The instrument utilized in these measurements has been the Keithley 23 Source Measure Unit.

These measurements have been performed using two types of cells. One of these is the glass cell of simple design utilized in our initial experiments and described in FIG. 7. This cell has proven very useful in obtaining comparative performance data in which the current produced under load in the well-studied phosphoric acid fuel cell can be compared with the current produced using the new electrolytes under physically very similar conditions. The only variable is the contact efficiency of the gases with the platinum wire electrodes which is slightly different for gases bubbling through liquids of different viscosity.

Because of the relatively small area of exposed platinum in experimental cells embodying preferred exemplary electrolytes of this invention, the currents flowing in these cells are small relative to those that must flow in a practical cell. In one proposed cell embodying the invention the electrode area is made enormously larger by using fine dispersions of platinum in electrodes of special design, optimized for phosphoric acid fuel cells. The inventors have also constructed a cell of the "sandwich" type to utilize such electrodes with the new inventive electrolytes and present the results herein. Because these electrodes have been developed over a long period in which they have been optimized for use with phosphoric acid electrolytes, it cannot be expected that the results will be of the same comparative value in assessing the possibilities of cells utilizing the particular electrolytes of the current invention. For top performance the new electrolytes will need to be applied in concert with electrodes that have been optimized for the particular wetting and penetration properties of the new electrolytes. However some indication of possible high current performance can be gained from these comparisons. Indeed, not withstanding the lack of optimization of any sort, performance almost at the level of the phosphoric acid cell has been obtained.

Aspects of this invention are remarkable. For example, the fuel cell of the invention works extremely well using electrolytes that are neither acid nor base in character, but rather are the neutral ionic liquids. The inventors disclose exemplary preferred embodiments in which this principle yields fuel cell performance superior in certain aspects to the common phosphoric acid fuel cell. Moreover, the inventors describe special additives to the neutral fuel cell electrolytes that remarkably increase the current that flows in the cell.

Aqueous solutions are generally assumed to be superior electrolytic conductors, due to the unique dielectric and fluid properties of water. The inventors demonstrate that their conductivities can be matched by liquid electrolytes that contain no solvent. These are proton transfer salts that are liquid at ambient temperature. The high conductivities are due to the high fluidity and ionicity rather than some sort of Grotthus mechanism, although in certain cases a mobile proton population may make a non-negligible contribution. The highest conductivities have been obtained when both cations and anions contain protons. 25° C. values of >150 mScm$^{-1}$ appear possible: 470 mScm$^{-1}$ at 100° C. has been measured. Due to the combination of high ionicity and proton exchange kinetics with low vapor pressure the systems described also make excellent fuel cell electrolytes.

The above and further features, advantages and objects of the invention will be better understood from the following detailed description of preferred exemplary and non-limiting embodiments of the invention when taken in consideration with the accompanying drawings.

BRIEF DESCRIPTION OF THE DRAWINGS

FIG. 8($b$) is the short circuit current flowing in the cells that provides the open circuit potential of part (a);

FIG. 9($b$) is a plot vs. temperature of the short circuit current flowing in the cells that provides the open circuit potentials of part (a);

FIG. 11($b$) is the open circuit potential vs. temperature recorded when the electrolyte in the cell was the standard phosphoric acid H$_3$PO$_4$ 96%, compared with performance when electrolyte is ethylammonium hydrogensulfate EAHSO$_4$, and EAHSO4 doped with 4 wt % of the weak base imidazole;

Figure 1:
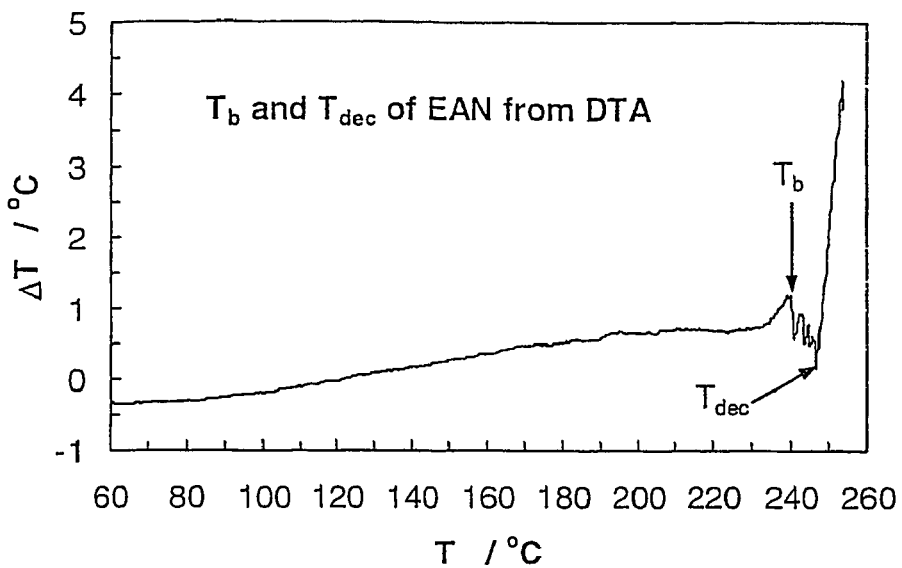
FIG. 1 is a DTA trace showing thermal events in the heating of ethylammonium nitrate from room temperature to above the boiling point.

FIG. A1 is a graphical representation of the glass transition temperatures of protic ILs in relation to the plot for aprotic salts of weakly polarizable anions;

FIG. A2($a$) is an Arrhenius plot of the fluidities of various protic and aprotic ionic liquids compared with other solutions noted;

FIG. A2(b) is a set of Arrhenius plots of the conductivities of protic and aprotic liquids compared with aqueous LiCl solutions;

FIG. A3(a) plots the relation of equivalent conductivity to fluidity for various protic and aprotic liquids;

FIG. A3(b) is a $T_g$-scaled Arrhenius plot to display the temperature dependence of the equivalent conductivity in relation to the temperature at which the fluidity reaches the glassy value of $10^{-11}$ poise ($10^{-13}$ p for inorganic network glasses).

FIG. A4 plots specific conductivities of dianionic protic ILs, normal protic ILs and further mixtures shown;

FIG. B2 are electrical conductivities of substituted ammonium nitrates in liquid and crystal states;

FIG. B3 is a set of DTA up-scans for DMAN and MAN showing relative strengths of solid state and fusion phase transitions;

FIG. B4 plots temperature dependence of ionic (protic) conductivity of $NH_4HF_2$ ($T_{melt}$=125° C., compared with that of concentration aqueous LiCl solution with 6 mole $H_2O/Li^+$;

FIG. B5 is a plot of I-V curves comparison of $[EtNH_3][NO_3]$ (EAN) with 85% Phosphoric Acid at 100° C. with bare platinum wire electrodes;

FIG. B6 is a plot of I-V curves comparison of $[Me_2NH_2][HF_2]$ ($DMAHF_2$) with 85% Phosphoric Acid with bare platinum wire electrodes;

FIG. B7(a) is an exploded cross-sectional view of a PTFE fuel cell;

FIG. B7(b) is a front elevation view of the cell of FIG. B7(a);

FIG. B8 is a plot of I-V curves comparison of $[Me_2NH_2][HF_2]$ ($DMAHF_2$) with 85% Phosphoric Acid at 100° C. on gas diffusion electrodes designed for Phosphoric Acid;

FIG. B9 is a plot of I-V curves comparison of $[EtNH_3][NO_3]$ (EAN) and $[Me_2NH_2][HF_2]$ with 85% Phosphoric Acid at 100° C. on gas diffusion electrodes designed for Phosphoric Acid;

FIG. B10 is a plot of an I-V curve of $[Me_2NH_2][NO_3]$ (DMAN) at 25° C. on gas diffusion electrodes designed for Phosphoric Acid;

FIG. C1 is a classification diagram for ionic liquids based on the classical Walden rule and deviations therefrom;

FIG. C2 is a set of differential thermal analysis scans for characterization of glass temperature ($T_g$) devitrification temperature ($T_c$) and liquidus temperature ($T_l$)(left scan) and boiling temperature (Tb) (right scan;

FIG. C3 plots, for the system α-picoline+trifluoroacetic acid, glass temperatures (open squares) devitrification temperatures (filled diamonds), liquidus temperatures or freezing points (open triangles) and boiling points at 1 atm pressure (solid circles);

FIG. C4 plots boiling points (see FIG. C3 description) in binary systems of the same base α-picoline with protic acids of different strengths as indicated by $pK_a$ values determined in aqueous solutions (see legend);

FIG. C5 is a plot of boiling point maxima in systems of strong base (n-propylamine) and different acids;

FIG. C6 is an Arrhenius plot of specific conductivities of different proton transfer ionic liquids, and shows that the conductivity behavior contrasts strongly with the viscosity behavior seen in the next figure;

FIG. C7 is an Arrhenius plot of the viscosities of the ionic liquids of FIG. C5 showing that the IL formed from the strongest acid is much the most viscous FIG. C8 plots the correlation of the excess boiling point (determined at the 1:1 composition) with the difference in aqueous solution $pK_a$ values for the component Bronsted acids and bases of the respective ionic liquids;

FIG. C9 is a set of Walden plots for the various ionic liquids obtained b in this work as indicated in the legend, the vertical line, at $\log(1/\eta)=1$ being used to define the deviations from "ideal" Walden behavior used to construct the next figure;

FIG. C10 graphically illustrates deviations from the "ideal" Walden behavior for ionic liquids plotted against $\Delta pK_a$ values for the component Bronsted acids and bases of the respective ionic liquids;

FIG. C11 is a graphical illustration of the poor correlation of glass transition temperatures $T_g$ with the $\Delta pK_a$ values for the acid base combination;

FIG. C12 is a diagrammatic illustration of the free energy levels G for protons on acid conjugate base pairs following Gurney; and FIG. C13 is a set of plots of conductivity isotherms for binary solutions of the two acid-base pairs showing conductivity minima at the stoichiometric compositions at which the glass temperatures maximize (see FIG. C3), high conductivities having realized in acid and base-rich compositions until decreasing ionic concentrations become dominant.

DETAILED DESCRIPTION

The Electrolytes

1. Proton Transfer Acid Base Systems

In the base electrolytes that are used for proof-of-concept purposes, the cation is formed by a proton transfer process. The transfer occurs from the acid HA to some base B. For instance, to form the ionic liquid (IL), ethylammonium nitrade (EAN), ethylamine may be combined with $HNO_3$ as was done by Walden in 1914 when he made the first ionic liquid. The inventors have been characterizing this and other proton transfer compounds that are low enough melting point either alone or in combination with other similar compounds to be liquid at room temperature. This is usually enough to ensure that they are easily supercooled into the glassy state. Ethylammonium nitrate melts at 14° C. On the other hand the boiling point which is set by the arrival of the combined vapor pressures of ethylamine and $HNO_3$ at the external pressure (1 atm for normal boiling) lies at 240° C., far above that of either of the components. This is, of course, due to the enormous vapor pressure lowering caused by the large negative free energy of proton transfer from the acid to the base. A DTA trace is shown in FIG. 1. The trace shows the onset of boiling at a temperature (240° C.) that is predicted both by extrapolation of data obtained on $HNO_3$-rich solution and also by a correlation of boiling point elevations with $pK_a$ given below. However the endothermic boiling process is accompanied by an exothermic process of chemical decomposition (246° C.) which rapidly becomes dominant. In fact the two probably commence simultaneously.

Figure 2:
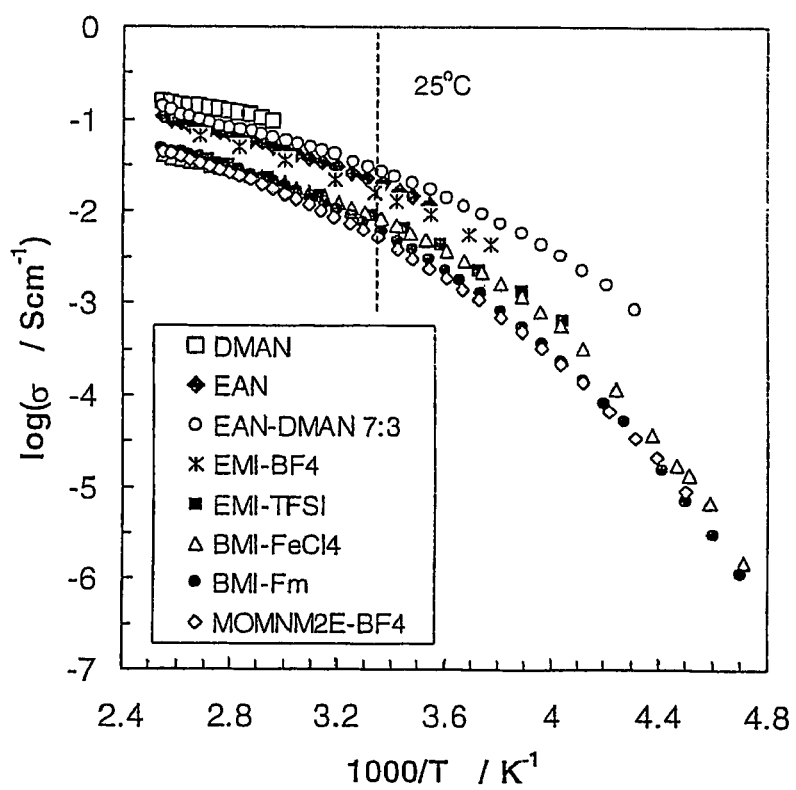
FIG. 2 plots electrical conductivity of ethylammonium nitrate (EAN), dimethylammonium nitrate (DMAN) and their mixture of eutectic composition compared with the highest conductivity ionic liquids reported to date (substances are identified in the glossary)

The mobilities of the ions $C_2H_5NH_3^+$ and $NO_3^-$ are very high due to the low viscosity of the ionic liquid (0.28 poise or 0.028 Pa·s, at 25° C.) and the electrical conductivity of the melt (20.8 mScm$^{-1}$ at 25° C.) is higher than that of most other ionic liquids. Data for this IL and some others of direct relevance are shown in FIG. 2. Data for many others are shown below.

Figure 3:
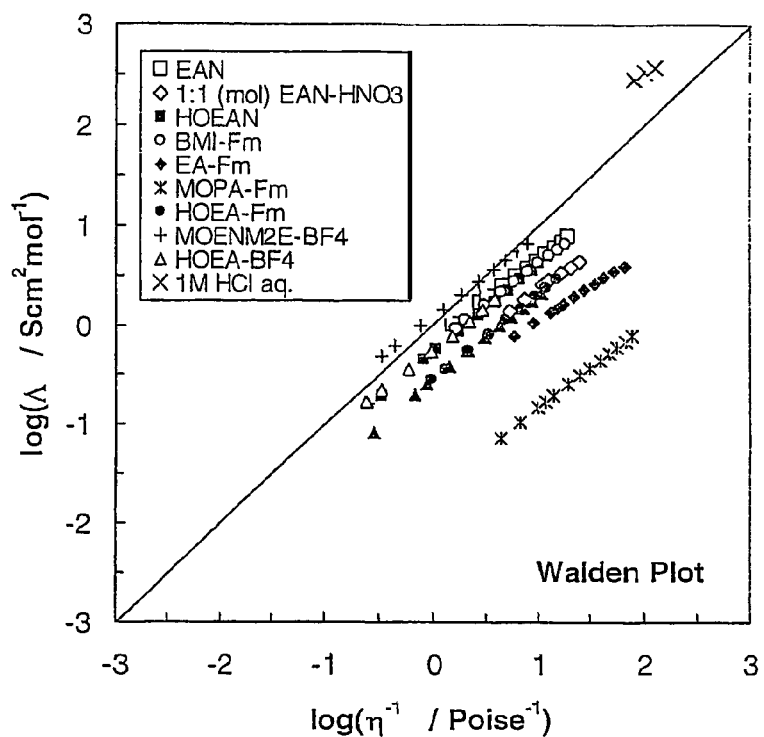
FIG. 3 is a comparison of equivalent conductivity/fluidity relations for ethylammonium nitrate with those of other proton transfer electrolytes and one non-protic ionic liquid (MOENM$_2$EBF$_4$) using the Walden classification plot, the non-protic case being chosen for its unusually close conformity with the ideal Walden behavior (other substances are identified in the glossary)

The transport of the charge is mainly ionic rather than protonic because the ratio of equivalent conductivity to fluidity is typical of ionic liquids and solutions. This is shown in the Walden plot of FIG. 3 which is discussed in much more detail below. When transport is assisted by the independent jumping of protons, as in aqueous mineral acids, the Walden plot lies above the ideal line and typically has a smaller slope. Some data for 1M aqueous HCl are included in FIG. 3 by way of example.

While the conductivity of ethylammonium nitrate is high, the conductivity of its isomeric form dimethylammonium nitrate, DMAN, is higher. The melting point of DMAN is above room temperature, 72° C. but its eutectic mixture with ethylammonium nitrate, in molar proportions 3:7, is lower ($T_e$=−20° C.) and this solution is slow to crystallize. Instead it supercools down to the glass temperature at −93° C. The conductivity of this eutectic mixture (27.8 mScm$^{-1}$ at 25° C.) and also that of DMAN above its melting temperature are included in FIG. 2.

Figure 4:
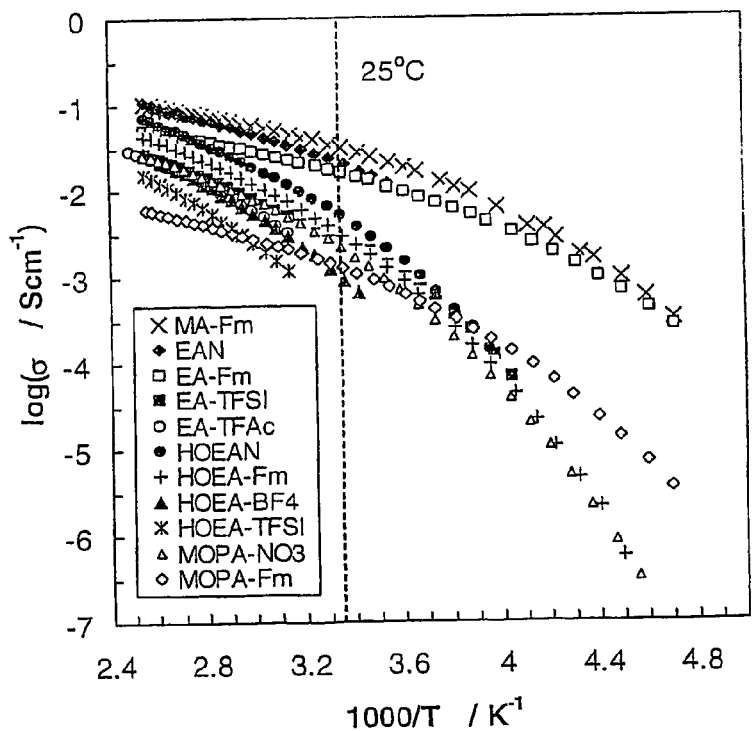
FIG. 4 is a comparison of the conductivities of a variety of the present proton transfer salts and shows the value at ambient temperature for ethylammonium formate EAFm being the same as that of the most highly conducting aprotic ionic liquid on record, EMIBF$_4$.

An enormous number of alternative proton transfer salts is available and many of them yield room temperature stable liquids. Of interest here are those with the highest conductivities. Some additional examples are shown in FIG. 4. Some of the empirical rules governing the value to be expected for the conductivity of such liquids are discussed in separate publication. To be of interest for fuel cell purposes the conductivity of the electrolyte at ambient temperature should be at least 10 mScm$^{-1}$ and preferably should be 30 mScm$^{-1}$ or higher. (The conductivity of 96 wt % phosphoric acid at ambient temperature is 46.6 mScm$^{-1}$ and at 200° C. is 0.51 Scm$^{-1}$). This condition is met by EAN so the inventors' initial studies of hydrogen/oxygen fuel cell performance have been carried out using pure ethylammonium nitrate of low water content. Follow-up studies have been made with DMAN and methylammonium nitrate MAN. A method of enhancing the conductivity to exceptional values for a hydrogen/oxygen fuel cell (values that are greater than those accessible with the standard high temperature fuel cell 96 wt % $H_3PO_4$) are described below.

Alternatively, the proton transfer salt BH$^+$A$^-$ may be replaced by a non-protic ionic liquid B'A, where B' may, for instance, be a cation formed by capping an amine nitrogen with —CH$_3$ instead of a proton to give the most popular type of "ionic liquid" (IL) or "ambient temperature molten salt" (ATMS). However in this case a protic component must be formed by adding some excess acid. The aprotic cation is less mobile, the viscosity is higher and the conductivity is lower than in the cases we have been exploring on a preferential basis.

2. Liquid Electrolytes

A series of high conductivity solvent-free ionic liquid electrolytes is presented in FIG. A4 which is taken from the report [54] incorporated herein by reference. This work was stimulated by the article [13] which in turn was a development following the finds of [12].

Since the report [54 containing FIG. 1, the inventors have synthesized some ionic liquid relatives of [NH$_4$][HF$_2$] and found the compound ethylammonium bifluoride [EtNH$_3$][HF$_2$] to be liquid at ambient temperature. The conductivity is found to be very high (8.6 mS/cm at 25° C.) though not as high as had been anticipated. This liquid has been used as an electrolyte in the fuel cell work reported below. The synthesis was performed in aqueous media by titrating the aqueous amine solutions with aqueous HF to the equivalence point followed by evaporation and drying at 120° C.

The inventors found that the fluidities and attendant conductivities of protic Ils tend to be much higher than those of aprotic Ils for reasons that are not completely clear. Residual H-bonding would suggest the opposite effect. It may lie in the reduction of the Madelung energy (the free energy lowering due to uniform distribution of negative around positive charge centers) that is responsible for the low vapor pressure of ionic liquids and molten salts (12-14). Whatever the explanation, the higher fluidities lend protic ILs an important advantage in any application where protonation of more basic sites in the system is not a problem.

The possibility that fluidities of protic ILs could be exceptional became apparent during a study of glass transition temperatures $T_g$ of Ils (12). $T_g$ is where the liquid state begins. It is the temperature above which fluidity becomes measurable and is, of course, relevant to fluidity at room temperature. For liquids of comparable fragility (i.e., those in which the fluidity above $T_g$ changes at the same rate with change of temperature (15)), the IL with the lower $T_g$ will be the more fluid at ambient temperature IL. The values of $T_g$ of simple mono- and di-substituted ammonium salts obtained either directly or by short extrapolations of data on their mixtures are found to be anomalously low. Values for ethylammonium nitrate ([EtNH$_3$][NO$_3$], I)(16) and two closely related protic ILs, dimethylammonium nitrate ([Me$_2$NH$_2$][NO$_3$], II), and ethylammonium formate ([EtNH$_3$][HCO$_2$], III) are shown in FIG. A1. There they are compared with the recent plot (12) that relates $T_g$ to molar volume (hence to interionic separations), for salts of weakly polarizable anions. The strikingly lower values of $T_g$ found for the protic ILs translate into ambient fluidities that are a full order of magnitude higher than that of the most similar aprotic ILs for which data are available, viz., the quaternary ammonium salt [N$_{1-o-1,211}$][BF$_4$] (12).

FIG. A1 shows glass transition temperatures of protic ILs in relation to the plot for aprotic salts of weakly polarizable anions from ref. 12. Protic ILs are (I) ethylammonium nitrate [EtNH$_3$][NO$_3$], (II) dimethylammonium nitrate [Me$_2$NH$_2$][NO$_3$], (III) ethylammonium formate [EtNH$_3$][HCO$_2$]. Case (IV) is [MeOPrNH$_3$][HCO$_2$] the formate of the methoxypropyl ammonium cation which combines positive charge and ether solvent in the same unit. The value for the simplest available glassforming nitrate of an aprotic ammonium cation [N$_{1-o-2,211}$]$^+$, are included. Notation: 1 is methyl, 2 is ethyl, 4 is n-butyl, —O— is ether oxygen, P$_{14}^+$ is N-methyl-N-n-butylpyrolidinium. The line through the points is a guide to the eye. The data points for [EtNH$_3$][NO$_3$] and [Me$_2$NH$_2$][NO$_3$] are obtained by short (15 mol %) extrapolations of their glassforming binary solution values. Note that the charge concentration of weakly polarizable aprotic ionic liquids with molar volumes at the $T_g$ minimum of FIG. 1A is about 4M.

The synthesis of a protic IL is very simple. Commercially available amines are dissolved in water and titrated with acid at 0° C. followed by rotary evaporation and vacuum drying at 70° C.

FIG. A2(a) Arrhenius plot of the fluidities of various protic and aprotic ionic liquids compared with those of LiCl.6H$_2$O ($T_g$=−134° C.) and the 1M LiCl solution.

Fluidity data for these substances and for some mixtures that are stable at ambient temperature are shown in the Arrhenius plots of FIG. A2(a). Surprisingly in view of its long history (16) there is very little recorded for the viscosity of [EtNH3] [NO3] (only values at 25 and 50° C. are available (17)) and there are no data for the related methylammonium and dimethylammonium salts. For comparison, the fluidity of a much-researched aqueous solution that is also capable of being cooled into the glassy state, LiCl.6H$_2$O (7.7M, $T_g$=−63° C.) (18) is also shown. Data for the 1M LiCl solution are also included. While the protic ILs are one or more orders of magnitude more fluid than the related aprotic salt, they are much less fluid than the concentrated aqueous solution.

Note that the formate anion provides the most fluid PiL. The formate anion also provides the most fluid ILs. (Notation: V is methylammonium nitrate [MeNH$_3$][NO$_3$] and [BMIM] is 1-n-bytyl-3-methylimidazolium. V-II is a mixture of [MeNH$_3$][NO$_3$] and {Me$_2$NH$_2$}[NO$_3$].

The conductivities corresponding to the fluidity data of FIG. A2(a) are shown in the Arrhenius plots in FIG. A2(b). Relative to 1M LiCl solution shown they still fall a little short though they are considerably higher than the highest conductivities reported for any non-aqueous lithium salt solution. In FIG. a2(b) the data for the electrolyte of the Sony Li ion battery (LiPF$_6$ in mixed ethylene carbonate-dimethyl carbonate) and for the highest conducting non-aqueous Li salt solution (LiBOB in acetonitrile) are included for comparison. The highest ambient temperature conductivity for any ambient pressure non-aqueous lithium salt solution is that for LiBOB in acetonitrile (10). (BOB is bis-oxalato-orthoborate). As seen in FIG. A2(b) it is well surpassed by the present liquids.

While the fluidity of [EtNH$_3$][NCO$_2$] is higher than for the nitrate, the electrical conductivity is not. Evidently the proton transfer is not complete. [EtNH$_3$][HCO$_2$] cannot be considered as "good" an IL as the nitrate, raising the issue of classification and or proton transfer-related properties. Oddly enough the formate of the hydrazinium cation is known to be a better conductor than [EtNH$_3$][NO$_3$] despite having a higher $T_g$ (20) (which would indicate a lower fluidity).

Elsewhere (12, 13) the classical Walden rule (21) which connects conductivity per mole of charge $\Lambda$ ($\Lambda = \sigma V_e$, where $V_e$ is the volume per equivalent) to the fluidity of the conducting medium, has been used as the basis for a classification diagram. The representation has the advantage of displaying both superionic and subionic behavior on the same diagram. Here the inventors combine this diagram with a $T_g$-scaled Arrhenius plot of $\Lambda$ so that the relation between temperature and equivalent conductivity can be seen at the same time as that between fluidity and conductivity (FIG. A3). The conductivity at the limit of high temperature should be the same as the conductivity at the limit of high fluidity which is recognized as lying at about the value $10^{4.5}$ poise$^{-1}$ (15). This limit is set by the shear relaxation time reaching the lattice vibration time ($\sim 10^{-14}$ s).

FIG. A3(a) plots the relation of equivalent conductivity to fluidity for various protic and aprotic ionic liquids. The heavy line in FIG. A3 is the ideal Walden line. Ideally, the temperature dependence of conductivity is set by the value for fluidity because the only force impeding the motion of an ion under fixed potential gradient is the viscous friction. The position of the ideal line is fixed by data for 1M aqueous KCl solution at ambient temperature. The data for LiCl.6H$_2$O fall close to it. In most charge-concentrated systems interionic friction causes loss of mobility which is more important at high temperature. This gives rise to the below-ideal slope found for all the Ils, protic or aprotic, seen in FIG. A3. A "fractional Walden rule" $\Lambda \eta^\alpha$=const, (0<$\alpha$<1), applies. When there is a special mechanism for conductance then the Walden plot falls above the ideal line, as for superionics, and the slope $\alpha$ provides a measure of the decoupling index (22).

FIG. A3(a) allows one to distinguish liquids with mechanisms for conductance that are more efficient than the Walden mechanism (e.g. superionic slip for small ions in certain melts (22) and Grotthus mechanisms for certain protonic solutions, particularly those with water (23)). However it does not reveal any difference between the protic ILs with strong proton transfers and the aprotic Ils. From their Walden plots they seem the same. To distinguish more sensitively between the extents of proton transfer in different cases and thereby to point the way to still higher conductivities, the inventors turn to an alternative approach which involves measurement of the excess boiling point.

As shown elsewhere (13), the excess of the measured boiling point of a protic IL over the additive value from its component boiling points can be correlated well with a quantity which is proportional to the free energy of transfer for protons between their Gurney energy levels on acids and bases (24). This is the difference in pK$_n$ values, which actually assesses the free energy of proton transfer referred to a particular value, which is that of the proton on a water molecule ($\Delta G^0 = -RT\ln(\Delta Ka)$). The inventors find that the excess boiling points for the three nitrate protic Ils of FIGS. A1 and A2 are predicted precisely by the plot in ref. 13 (see also (25)). This plot therefore allows one by extrapolation to say what would be the excess boiling point and hence the actual boiling point of any protic IL not yet studied. It correctly predicts that the boiling points of the combinations of various strong bases with the superacid hydrogen trifluoromethanesulfonic acid are too high to measure (because of prior decomposition of the cations).

Thus protic ILs that are indistinguishable with regard to ionicity by FIG. A3(a) do reveal their differences by the excess boiling point criterion. The probability of the proton returning to its point of origin on the anion of the electrolyte and then escaping into the vapor (associated with boiling of the electrolyte) must be a Boltzmann function of the free energy change of the protonation reaction (13, 25).

It is behavior of the boiling points of these liquids provides the clue to take one to the next level of fluidity and conductivity. For this the inventors make the following observation. While the equilibrium constant for the proton transfer process is overwhelmingly in favor of ions over molecules at ambient temperature for [EtNH$_3$][NO$_3$] and its analogs, the vanishing probability that the proton will instantaneously reside on the anion still appears to play a role in the high fluidity (FIGS. A1 and A2). If this is the case the same principle could possibly be brought to operate on the anion and so enhance the fluidity while maintaining a low vapor pressure. The inventors therefore investigate the case of the hydrogen bonded di-anionic protic IL, evidence for the stability of which was recently given (13).

FIG. A3(b) is a $T_g$-scaled Arrhenius plot to display the temperature dependence of the equivalent conductivity in relation to the temperature at which the fluidity reaches the glassy value of $10^{-11}$ poise ($10^{-13}$ p for inorganic network glasses). The inorganic superionic systems have very high conductivities at their glass temperatures. Sub-ionic (associated, ion-paired, etc.) systems have low conductivity at all temperatures. The ideal (ion interaction-free) behavior for conductivity is shown by the dashed line plot of infinite dilution conductivities for KCl in H$_2$O (data from Robinson and Stokes (27)). To include these data $T_g$ as 138 K is assigned since high temperature viscosity fitting suggests it. The real value for water is controversial.

Selected plots in parts (a) and (b) have been extrapolated to have the same value at infinite temperature as at fluidity=$10^{4.5}$ poise$^{-1}$. In absence of ionic interactions the behavior at T>2.5T$_g$ should obey the Arrhenius law (15).

It was found that in the system $\alpha$-methylpyridine+trifluoroacetic acid the boiling point maximizes (at 200° C.) at the di-anion composition while the glass transition temperature maximizes at the stoichiometric (1:1) composition (13). thus while the vapor pressure at the dianion composition is minimized the conductivity of the liquid is increased. In the protic IL nitrate the dianion composition does not have the maximum boiling point because of the greater proton transfer energy at the stoichiometric composition. However it remains relatively high (164° C.) and the conductivity is certainly increased. The data are included in FIG. A4 where the conductivity is seen to be essentially the same as that of 1M aqueous LiCl.

FIG. A4 shows specific conductivities of dianionic protic ILs compared with (i) normal protic ILs (single component [EtNH$_3$][NO$_3$] and mixtures {[MeNH$_3$][NO$_3$]—[Me$_2$NH$_2$][NO$_3$]}), (ii) aprotic quaternary ammonium IL, and (iii) aqueous LiCl solutions (1M and 7.7M i.e. LiCl.6H$_2$O. The dianionic nitrate reaches the level of 1MLiCl and so does the mixture of [MeNH$_2$][NO$_3$] and [NH$_4$][HF$_2$]. There is a startling increase to values equaling those of the LiCl.6H$_2$O solution when pure [NH$_4$][HF$_2$] is measured. Ambient temperature liquid analogs are expected when [NH$_4$]$^+$ is replaced with [EtNH$_3$]$^+$, [Me$_2$NH$_2$]$^+$, [MeNH$_3$]$^+$, etc.

One can take the dianionic protic IL concept one step further by introducing the strongest dianion known, [HF$_2$]$^-$. Indeed, an ionic liquid incorporating this anion (however with excess HF) has already been reported as having exceptional conductivity (26). The conductivity of [NH$_4$][HF$_2$] which is commercially available has been measured (at the cost of some cell corrosion) and is included in FIG. A4. It is seen to be as high as that of the 7.7M LiCl solution which we have now measured into the >100° C. temperature range. The comparison is only made at high temperature because [NH$_4$][HF$_2$] is not an ambient temperature IL (Tm=125° C.). However since [NH$_4$][NO$_3$] has a melting point much higher than [MeNH$_3$][NO$_3$], [MeNH$_2$][NO$_3$] or [EtNH$_3$][NO$_3$] and also [NH$_4$][HF$_2$] it is reasonable to expect that [MeNH$_3$][HF$_2$] or its mixtures with [Me$_2$NH$_2$][HF$_2$] and [MeNH$_3$][HF$_2$] will be liquid at ambient temperature and that they will have conductivities comparable with those suggested by the data for [NH$_4$][HF$_2$].

Finally the inventors make an alternative comparison with LiCl.6H2O by including in FIG. A4 data for [Me$_2$NH$_2$][NO$_3$].6HNO$_3$ which is also glassforming with T$_g$ of −130° C. vs. −134° C. for LiCl.6H$_2$O (the boiling point is 103° C. vs. 138° C. for Licl.6H$_2$O). Despite its higher T$_g$, its conductivity is higher than that of LiCl.6H$_2$O, apparently due to a higher fragility.

The inventors conclude with the observation that the only systems that yield conductivities much higher than those of the protic ILs described here are the aqueous acid systems in which a decoupled proton (Grotthus mechanism) operates (23). Watanabe and coworkers (28) have recently shown that a weak decoupling occurs in the solution, in excess imidazole, of the proton transfer salt made from imidazole and HTFSI (m.p.=73° C.). It is an objective of future work to determine the conditions in which substantial decoupled proton motion can occur in neat protic ILs. The extraordinary conductivity of [NH$_4$][HF$_2$] suggests one may not have far to look.

Proton-rich ionic liquids of this invention are based on the combination of protonic acids with the active anions made available by the presence of weakly basic cations of the type formed by proton transfer discussed above. Alternatively the aprotic cations which are now widely used in "ionic liquid" or "ambient temperature stable molten salt" media may be used but at some cost in conductivity.

The formation of such di-anions (AHA) that are held together by strong hydrogen bonds can raise the boiling points of volatile acids by 100° C. or more as demonstrated below.

Figure 5:
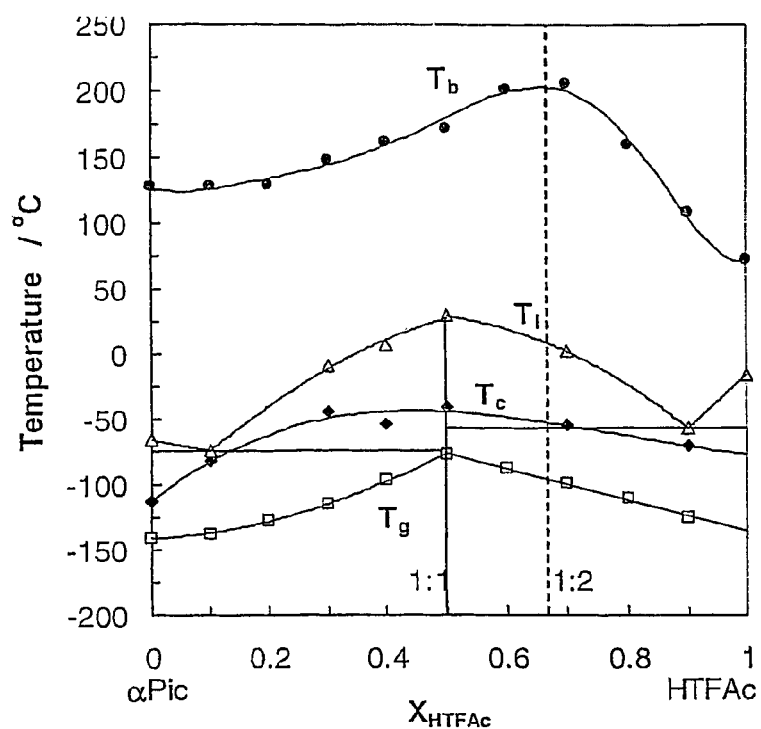
FIG. 5 is a plot of boiling point and other thermal transition temperatures against varying compositions in the acid/base system α-picoline+trifluoroacetic acid.

To set forth further the properties of the proton-carrying fluids of this invention, the inventors studied the subject of proton transfer salts and their solutions in excess acid and excess base. Cases were demonstrated in which the bonding of the protonic acid to the anion (of the salt formed by transfer of the first proton) is very strong. It is so strong that the normal boiling point (at which the total vapor pressure due to all volatile species reaches one atmosphere) reaches its maximum value at the stoichiometry of the di-anion. Reference is made to FIG. 5. This figure shows the system α-picoline+trifluoroacetic acid showing glass temperatures (open squares) devitrification temperatures (filled diamonds), liquidus temperatures or freezing points (open triangles) and boiling points at 1 atm pressure (solid circles). In this system formed from trifluoroacetic acid (HTFAc) and the base α-picoline (α-pic) (2-methyl pyridine), the maximum melting point in the system is found at the 1:1 compound (the simple proton transfer salt 2-methylpyridinium trifluoroacetate). However the boiling point reaches its maximum value at which the combined vapor pressures of acid and base components equals 1 atm at the stoichiometry of the hydrogen bonded di-anion (AHA). Other cases in which the boiling points at the di-anion stoichiometry are even higher than in FIG. 1 of this disclosure are shown below.

Figure 6:
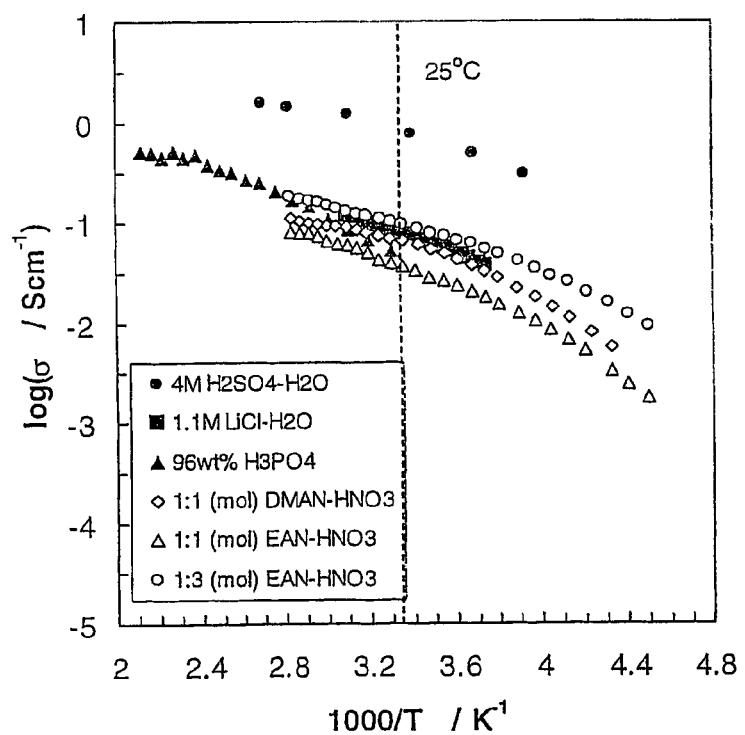
FIG. 6 is a comparison of the conductivities of two of the liquids of the invention with those for most highly conducting solution of lithium chloride, the most conducive of all known lithium salt solutions, the standard phosphoric acid fuel cell electrolyte, and finally the conductivity of 4M aqueous H$_2$SO$_4$ which is the most highly conducting of the known ionic conductors.

The conductivities of the acidified melts are found to be considerably higher than those of the neutral liquids shown in FIGS. 2 and 4 (see FIG. 6). Whereas the liquids containing the ethylammonium cation were seen to exhibit conductivities up to 20.8 mScm$^{-1}$ at ambient temperature in the absence of di-anions, the ambient conductivity of [EAN]$^+$[H(NO$_3$)$_2$]$^-$ reaches an astonishing 37.6 mScm$^{-1}$. Finally, the conductivity of the liquid acid salt of stoichiometry XA.HA (where XA is dimethylammonium nitrate DMAN, and HA is HN$_3$) brings the conductivity of non-aqueous electrolytes into the range of aqueous solutions for the first time. The conductivity of this solution has been found to be 65.7 mScm$^{-1}$ at ambient temperature. Increasing the acid content to XA.3HNO$_3$ finally breaks the "100 mSCM$^{-1}$ barrier" for the first time for a non-aqueous solution. This is believed to be the highest conductivity ever measured for a non-aqueous liquid. In FIG. 6 data for these new ionically conducting liquids are compared with those for 1.1M solution of lithium chloride, the conductivity of 96 wt % phosphoric acid and finally the conductivity of 4M aqueous H$_2$SO$_4$ which is the most conductive of the known ionic conductors.

The inventors have reported a systematic study of systems in which the protons have been added in as the anhydrous acids, such as formic acid, trifluoroacetic acid and triflic acid (i.e. trifluoromethanesulfonic acid) that are commercially available in the anhydrous form. However others are possible. Indeed the inventive, exemplary test fuel cell did not include using as electrolyte, the ionic liquid, ethylammonium nitrate EAN upon which the inventors reported was not reported upon because it was already well known. However, its application as a fuel cell electrolyte is believed new. EAN has a conductivity that is superior to any described in the inventors' reported work but its behavior cannot easily be followed over the whole acid/base range of compositions because the base of the system, ethylamine, is a gas at room temperature (boiling point, T$_b$=16.6° C.).

3. Rotator Phase Solid Electrolytes

Here the inventors disclose electrolytes that have been prepared and characterized with respect to phase transitions and conductivities but have not yet demonstrated an be used as solid electrolytes in working fuel cells. They are closely related to the substituted ammonium nitrates and ammonium bifluorides of the preceding section.

The inventors have noticed in the course of developing ambient temperature ionic liquids of unprecedented conductivities [1] that, in the substituted ammonium cation systems, there are a number of rotator phases with very high electrical conductivities. These have raised the possibility of using certain principles involving ion rotations that were exploited in the science of lithium solid state electrolytes [5-7] to produce proton conducting membranes that could meet or out-perform the conductivities of the inorganic rotator phases being explored by Haile and coworkers [8] while being more economical and less toxic. Many of the cases for which we have data have been studied previously by workers interested in the physics of rotator phases 99, 10] but no consideration of the possibility that they might serve as solid-state electrolytes for fuel cells has previously been made. It is not clear at this point if the high conductivity of these solid phases is due to a proton transfer mechanism or whether vehicular transport is involved. For purposes of a functional fuel cell it does not matter, as no concentration gradients can be established in these single component systems. If no concentration gradient can be established, yet when protons can be taken up at the anode and transferred in an electrode reaction at the cathode, then the electrolyte is effectively a unit transport number electrolyte for protons. This is a long-sought-after objective in fuel cell electrolytes.

Here the inventors present recent data on the phase relations and conductivity behavior of ethylammonium nitrate (EAN), dimethylammonium nitrate (DMAN) and methylammonium nitrate (MAN) and certain mixtures thereof. Because of their high conductivities these electrolytes will serve as a basis for establishing the proof-of-concept that is needed at the outset to stimulate the development of practical examples of the same principle.

FIG. B2 shows, in Arrhenius plot form, the conductivities of the salts EAN, DMAN and MAN. Whereas EAN is a liquid at room temperature, the other two are not. Nevertheless, one of them, DMAN, maintains a very high conductivity 10-2.6 S/cm at room temperature and approaches 10-1 S/cm before it melts. It is expected that the conductivity is related to the rapid rotation of the ions which has been the primary source of interest in these materials so far [9, 10].

FIG. B3 is a set of DTA up-scans for DMAN and MAN showing relative strengths of solid state and fusion phase transitions. In the case of DMAN, the plastic crystal is a "Timmermans rotator" [9,10]. FIG. B3 relates the conductivity behavior to the phase transitions that occur with change of temperature. It is clear from the differential thermal analysis DTA trace for MAN shown in FIG. B3 that this solid substance has generated most of the entropy usually appearing on fusion at the temperature 78° C. where a solid-solid transition occurs. This is due to the onset of cation or anion rotation, perhaps both, which has been much investigated [9, 10]. DMAN also shows a strong solid-solid transition at the lower temperature 20° C. but the magnitude is smaller relative to fusion. Some data on mixtures of these rotator phases is provided as supplementary material. The ambient temperature conductivity of the 90DMAN-10MAN plastic crystal is remarkable 10 mS/cm.

An even more remarkable solid-state conductor is the solid form of the compound $NH_4HF_2$ which is related closely to one of the liquids that we are reporting in succeeding sections. The conductivity of solid $NH_4HF_2$ at ambient temperature is very high (20 mS/cm) and >100 mS/cm at 100° C. (FIG. B4). FIG. B4 plots temperature dependence of ionic (protic) conductivity of $NH_4HF_2$ (Tmelt=125° C.) compared with that of concentration aqueous Licl solution with 6 mole $H_2O/Li^+$. The conductivity in the solid state as in the case of nitrates is not very reproducible but is always high. It is so high that it is difficult to believe that it is due solely to diffusion of the ionic components of the lattice. Rather it seems probable that there is a large contribution from proton hopping between the rapidly rotating ions. Based on the nitrate studies (ref. 10 and FIG. B2) one may expect even higher conductivities in the substituted ammonium cation derivatives and particularly in their mixtures.

4. Glass Cell: Platinum Wire Electrodes

The cell is diagrammatically illustrated in FIG. B7.

(a) Comparison of Performance of New Electrolyte Ethylammonium Nitrate with Phosphoric Acid Electrolyte at 100° C.

FIG. B5 is a plot of I-V curves comparison of $[EtNH_3][NO_3]$ (EAN) with 85% Phosphoric Acid at 100° C. with bare platinum wire electrodes. Results show that the voltage of the cell with the EAN electrolyte is always higher than that with the phosphoric acid electrolytes and that the maximum power generated by the former (obtained from the point of maximum slope (dE/di) max is much greater for the new cell.

(b) Comparison of Performance of a New Electrolyte, [Me2NH2][HF2] with Phosphoric Acid Electrolyte From FIG. B6 it is seen that the performance of the cell utilizing the bifluoride protic IL is extraordinary. At room temperature, the voltage generated at any given current is superior to that of the phosphoric acid cell at a temperature 150° C. The bifluoride cell could not be studied at higher temperature because corrosion of the glass caused the frit to collapse. Data are obtained at higher temperatures in the teflon sandwich cell described below.

5. Teflon Cell: Colloidal Pt Electrodes (High Surface Area)

The cell is displayed in FIG. B7. The performance of this cell with the phosphoric acid electrolyte for which the electrodes were optimized is shown in FIG. B4. This is the performance expected for the phosphoric acid cell. Such performance is only obtained after a "breaking-in" period which amounts to some hours of exposure to the electrolyte and prolonged generation of current (which is initially quite small). It evidently takes time for the electrolyte to properly permeate the electrode properly and gain access to the full platinum surface. These data re to be compared with those in the literature for successful phosphoric acid cells [12].

When the ionic liquid electrolytes are introduced to such a cell with fresh electrodes in place, the performance is very bad. It is clear that the electrolyte cannot achieve the initial penetration of the electrode structure. This is not surprising: the electrodes were developed and optimized for use with $H_3PO_4$ electrolytes.

On the other hand, if the cell is initially broken in with $H_3PO_4$ electrolyte, and the $H_3PO_4$ electrolyte is then removed and replaced by one of the new electrolytes, a new steady state is quickly attained and cell performance can be quite good-though presumably not nearly as good as with a high dispersion platinum electrode optimized for the properties of the protic IL electrolytes.

(a) $[Me_2NH_2][HF_2]$ Electrolyte

We show the performance of the electrolyte $\{Me_2NH_2\}[HF_2]$ in comparison with $H_3PO_4$ in FIG. B8. With an electrode optimized for this electrolyte, it is believed that superior performance can be achieved.

(b) $[EtNH_3][NO_3]$ Electrolyte

The superiority of the ethylammonium nitrate electrolyte cell over that with phosphoric acid was seen in FIG. B5. Here we find that when the phosphoric acid electrolyte is replaced with EAN the voltage of the cell under open circuit conditions rises to a remarkable 1.2 volts. The possibility is raised of a much higher energy cell with an even higher maximum power. However the favorable voltage cannot be sustained when substantial current is drawn. The initial superiority and its rapid decline is shown in FIG. B9 which combines the new data with those of FIG. 5. It seems probably that with improvements in electrode design a very high performance cell could be obtained.

(c) Solid Protic [Me2NH2][NO3] Electrolyte

When the phosphoric acid electrolyte is replaced with the solid protic electrolyte DMAN [Me2NH2][NO3] the voltage of the cell at 25° C. under open circuit conditions rises to a remarkable 1.14 volts. Again the favorable voltage cannot be sustained when substantial current is drawn, probably because these electrodes are specifically designed for phosphoric acid. The initial superiority and its rapid decline is shown in FIG. B10. It seems probable that with improvements in electrode design a very high performance cell could be obtained.

Chemical and Electrochemical Applications of the Electrolytes of the Present Disclosure 1. Metal Dissolution The anion-trapped proton is believed available to do chemical work. The protons can exchange with zinc metal as demonstrated by the release of hydrogen when the ionic liquid is reacted with powdered zinc, though this electron transfer is low unless there are —OH groups on the cation and requires heating to occur freely. This aspect of the application of the acid ionic liquids is not of great importance at this time relative to the application to fuel cells.

2. Fuel Cells

The primary interest in these high conductivity high boiling point electrolytes must lie in their potential to serve as electrolytes in high temperature fuel cells. Indeed an announcement of the viability of such a cell utilizing proton transfer ionic liquid electrolytes as just been made. (In the rapid publication journal Chem. Comm. Watanabe and co-workers provide what is believed to be the first report of a demonstration of the viability of the proton transfer salt as an electrolyte for the hydrogen electrodes and the hydrogen/oxygen fuel cell.) The electrolyte of the inventors' version has much higher performance with respect to current, making it possible to compete with the performance of the standard high temperature fuel cell electrolyte, phosphoric acid with 4 wt % water.

The inventors also disclose a successful strategy for increasing the current to values above those of the phosphoric acid fuel cell over a wide temperature range while maintaining a competitive cell voltage.

Figure 7:
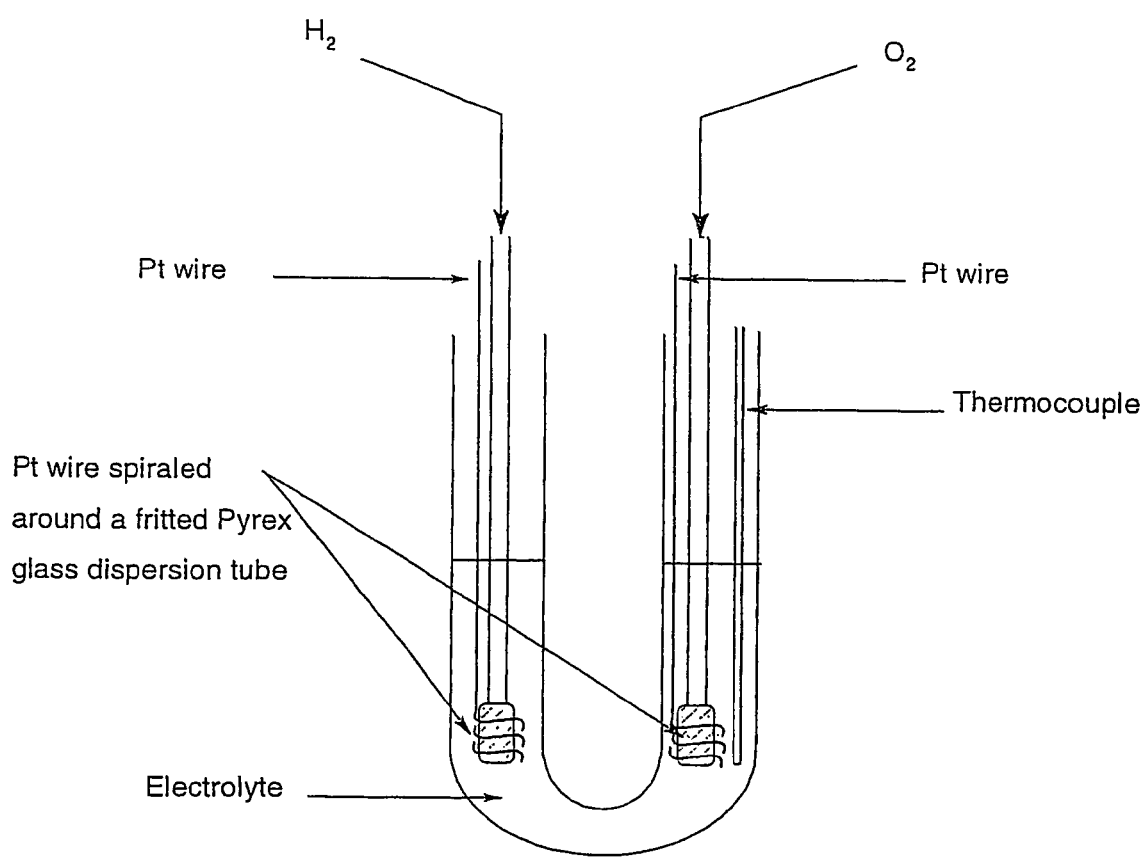
FIG. 7 is a diagrammatic illustration of a U-cell for fuel cell electrolyte testing over wide temperature ranges.
Figure 8:
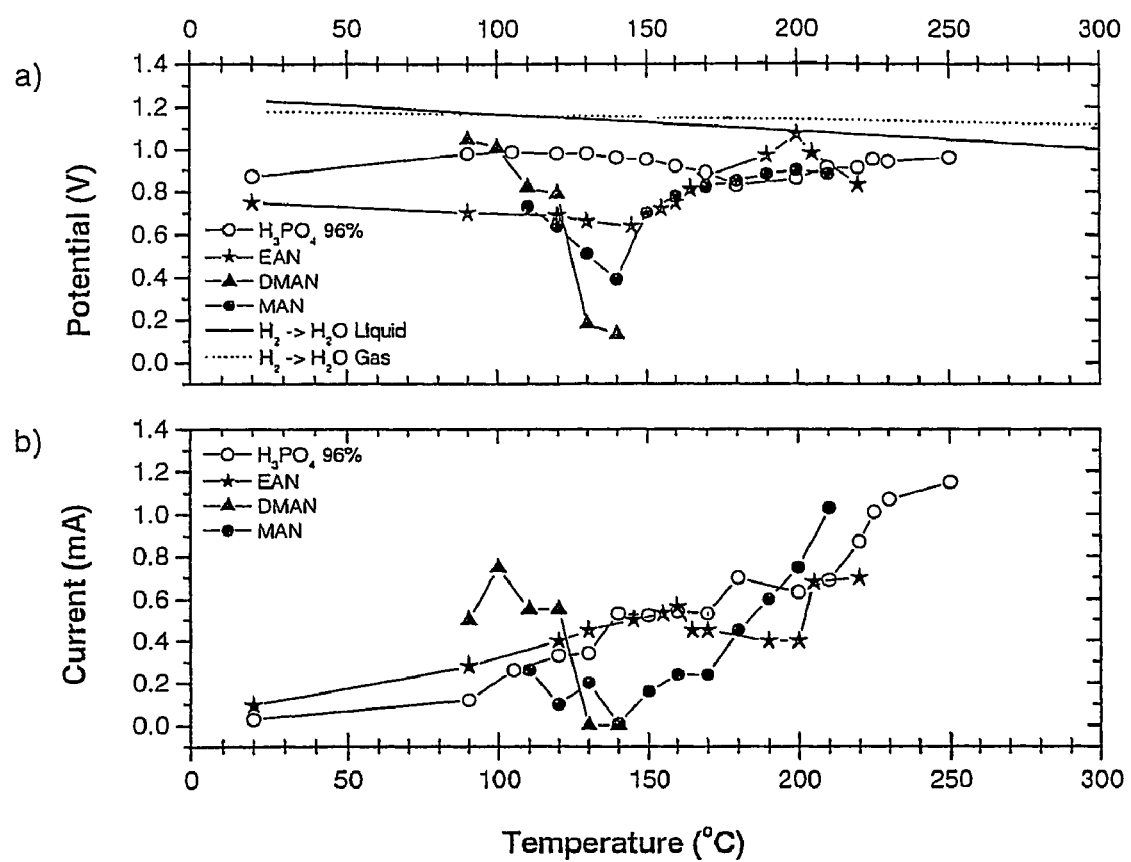
FIG. 8($a$) is the open circuit potential recorded when the electrolyte in the cell was the standard phosphoric acid (with 4 wt % water), compared with performance when electrolyte is EAN, DMAN or MAN.

To examine the potential of the preferred embodiment proton transfer salts of this invention for fuel cell applications, a simple hydrogen oxygen fuel cell using the U-cell design shown in FIG. 7 was constructed. Hydrogen and oxygen are bubbled over unplatinized platinum electrodes on the left and right hand sides of the cell respectively. In the first version of the cell, used to obtain data shown in FIGS. 8 and 10 (cell 1), the frit used to disperse the H$_2$ bubbles in cell 2 (FIG. 7) was not present.

The following reactions are believed to occur at the electrodes:

At the anode:

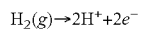

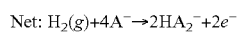

At the cathode:

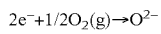

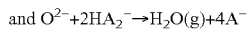

The net cell reaction is of course H$_2$(g)+1/2O$_2$(g)→H$_2$O(g)

The potential of the cell is determined by the sum of the reversible cell potential and the respective electrode overpotentials which must be minimized. The most serious of the over-potentials, in the general view, is the oxygen reduction overpotential. It is this overpotential that is considered to be the main cause of the reduction of the phosphoric acid fuel cell potential below the theoretical value.

The potential of the cell during steady bubbling of commercial cylinder hydrogen and oxygen was monitored using a Keithley Model No. 177 Microvolt DMM potentiometer. The current passing through an external circuit connecting the two electrodes was measured using the Keithley multimeter in ammeter mode.

For a steady flow of hydrogen and oxygen over the simple platinum wire helical electrodes of cell 1, the potential recorded when the electrolyte in the cell was the standard phosphoric acid (with 4 wt % water) is shown in FIG. 8(a). The current recorded as the temperature of the cell was raised from room temperature to 200° C. is shown in FIG. 8(b).

To compare with these plots we shown (also in FIGS. 8(a) and 8(b)) the potential and current flowing in the same cell when the electrolyte is (i) ethylammonium nitrate EAN, (ii) diethylammonium nitrate DMAN, and (iii) methylammonium nitrate MAN. The latter two electrolytes can only be used at high temperatures because the melting points are 72° C. and 109° C. respectively. However in applications needing ambient temperature performance they can be mixed together or with EAN. The eutectic temperature in the case of DMAN-MAN lies below room temperature.

Tested at this level the new fuel cells appear to exhibit superior performance. The voltage output of the EAN case is remarkably higher than for the phosphoric acid fuel cell though it looses voltage at higher temperatures for reasons that are not currently understood.

Figure 9:
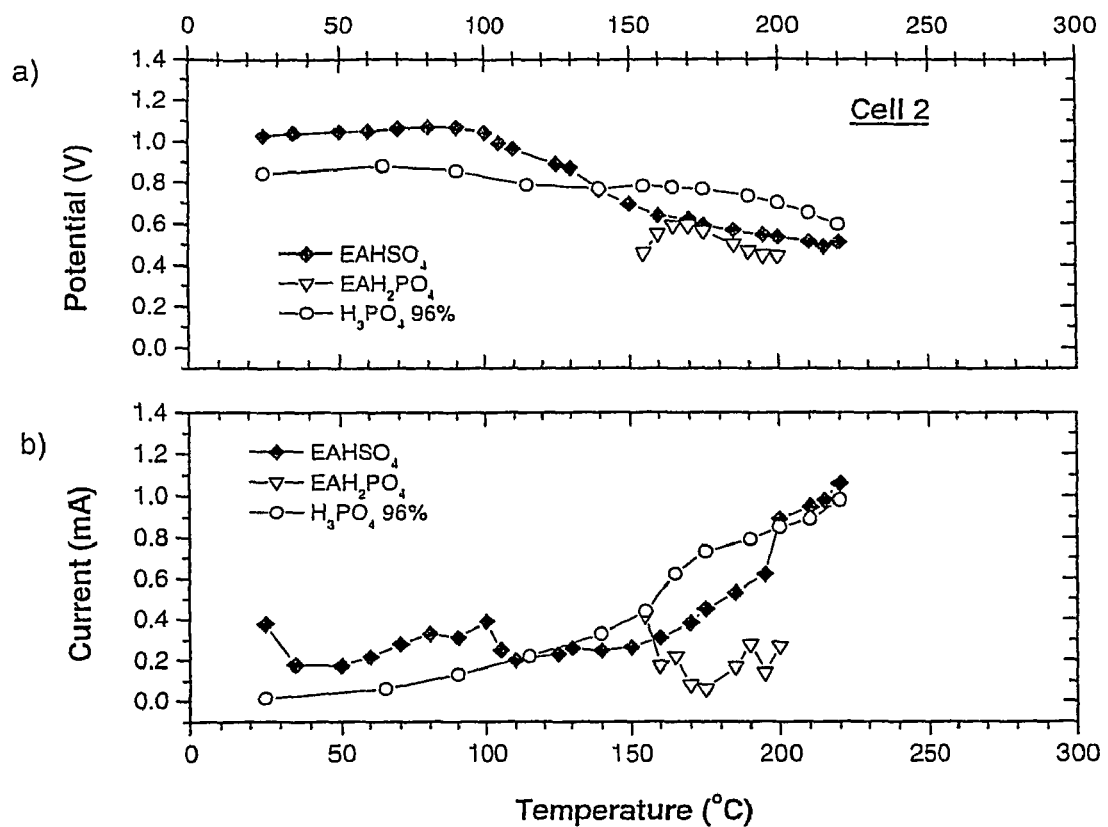
FIG. 9($a$) is a plot vs. temperature of the open circuit potential recorded when the electrolyte in the cell was the standard phosphoric acid (with 4 wt % water) compared with performance when electrolyte is ethylammonium dihydrogenphosphate or ethylammonium hydrogensulfate using the same hydrogen flow rates.

While their conductances are very high there is a disadvantage in the use of nitrate-based electrolytes related to their chemical instability and the potential for explosion. Therefore a number of other possible electrolytes of this general type using anions that do not have oxidizing power have been tested. For this case there was used a cell of slightly different design (cell 2, FIG. 7) with smaller electrolyte volume and with modified electrodes that used glass frits intended to disperse the gases in the vicinity of the Pt wire electrodes into smaller droplets. The same hydrogen flow rate in each test was used. FIG. 9 shows data for the proton transfer salts of ethylammonium dihydrogenphosphate and ethylammonium hydrogensulfate. The latter in particular seems promising at low temperature, but fails to match the performance of the phosphoric acid cell except at the highest temperatures. At 200° C. its performance becomes superior, though only a little. In view of the fact that unlike H$_2$SO$_4$, HSO$_4^-$ is weak acid and the acid salt is not hydroscopic, it would seem to offer great potential for high temperature fuel cell applications. The hydrogensulfate electrolyte is not even a neutral proton transfer salt.

A remarkable phenomenon that distinguishes the fuel cell of the present invention from any prior work and which maybe permits utilization at much lower temperatures is the remarkable increase in current that flows in the cell when the simple proton transfer salt electrolyte is modified by inclusion of a molecular base that is chosen for two properties:

(i) it is involatile particularly at low concentrations in a low vapor pressure medium; and (ii) it is intermediate in Bronsted basicity between the base (ethylamine) and the acid ($HNO_3$, $H_2SO_4$, etc.) that are combined to form the primary proton transfer electrolyte and so will not be preferentially protonated.

Figure 10:
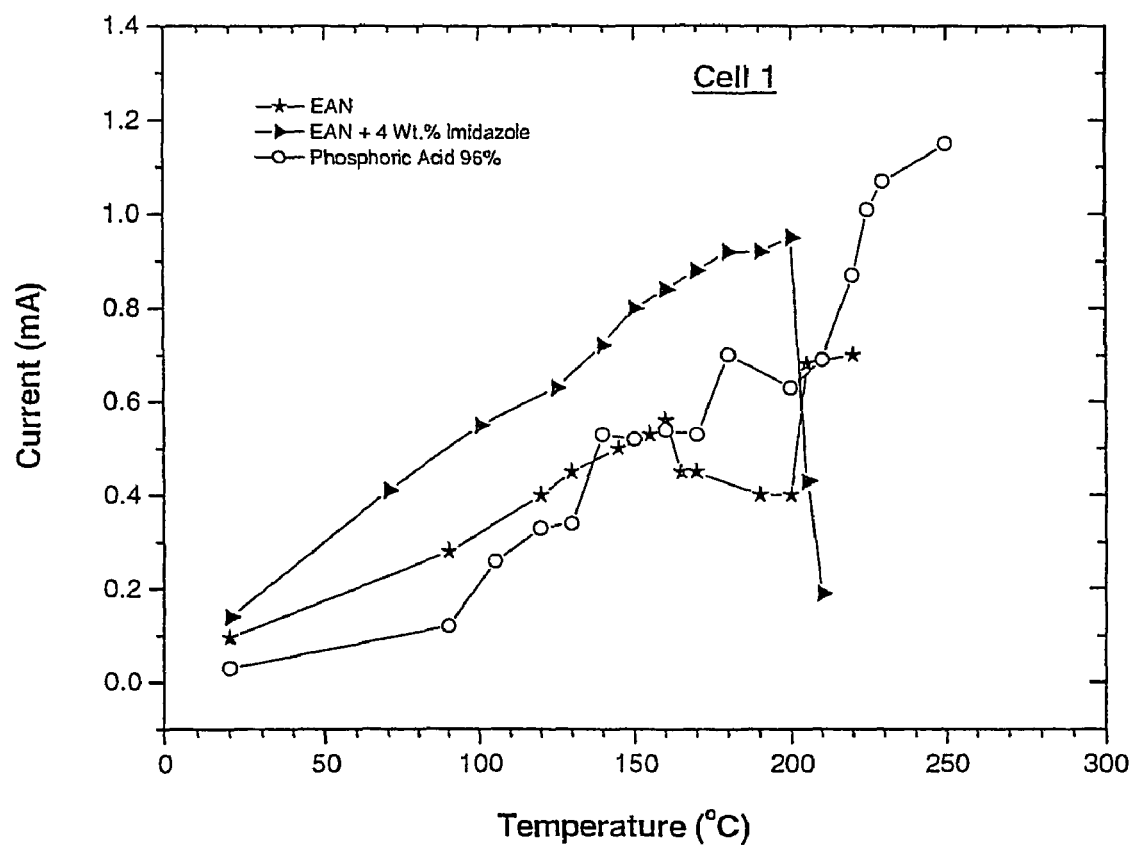
FIG. 10 is a plot of current vs. temperature showing augmentation of the short circuit current flowing in the cell A when 4 wt % of the involatile (weak) base, imidazole, is added to the electrolyte EAN, comparison being made with cells containing EAN and 96% H$_3$PO$_4$ as the electrolyte.

FIG. 10 shows the comparison of current, in FIG. 10(a), and voltage, in FIG. 10(b), for the ethylammonium nitrate cell with and without 4 wt % imidazole as additive. Included for comparison are the voltage and the current when 96 wt % phosphoric acid is the electrolyte in the same cell using the same $H_2$ flow rate. It can be seen that with a slight sacrifice in voltage the current at low temperatures is nearly doubled and considerably improved it at high temperatures.

Figure 11A:
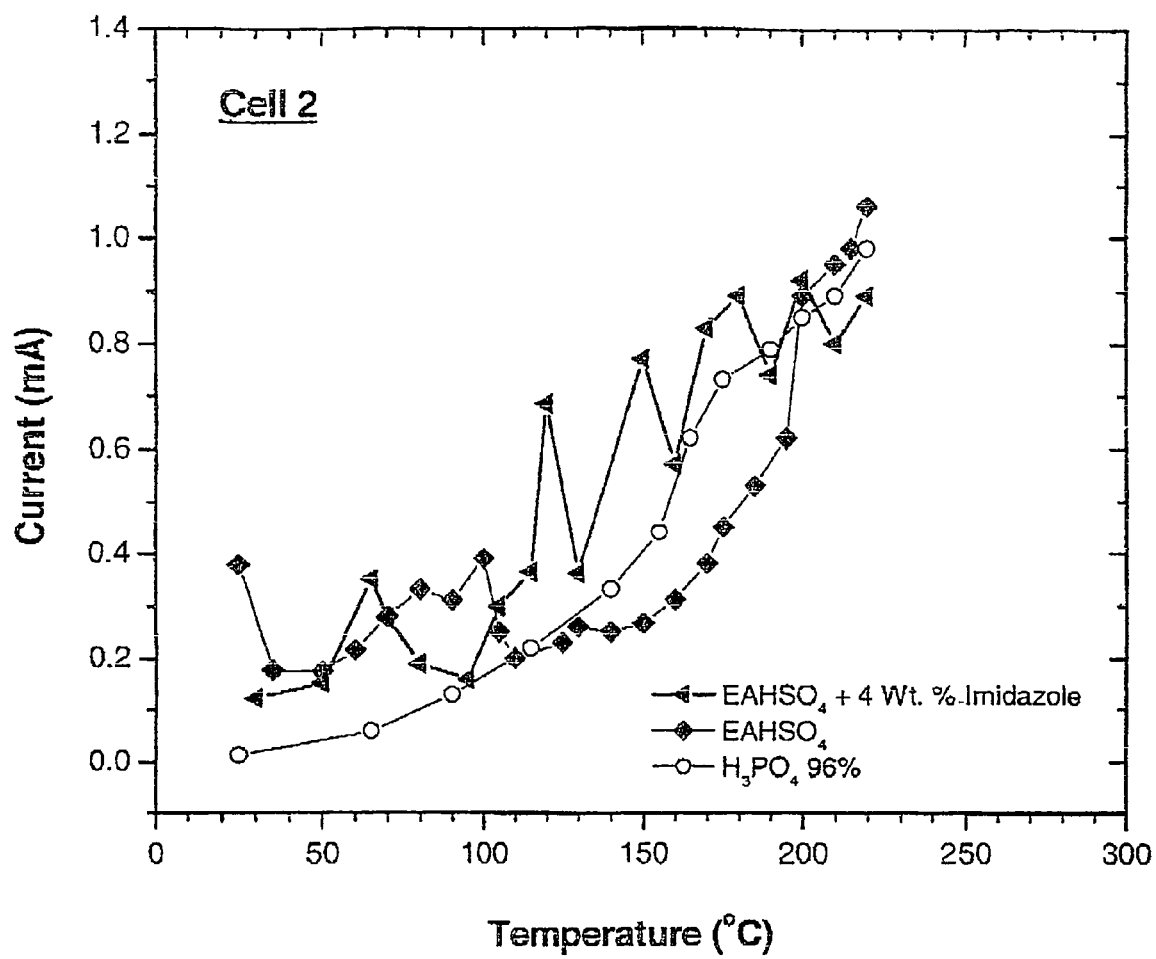
FIG. 11($a$) is a plot of current vs. temperature showing augmentation of the short circuit current flowing in the cell B when 4% of the involatile (weak) base, imidazole, is added to the electrolyte ethylammonium hydrogensulfate, comparison being made with performance of the cell with the undoped electrolyte and with that of 96% H$_3$PO$_4$ as the electrolyte.
Figure 11B:
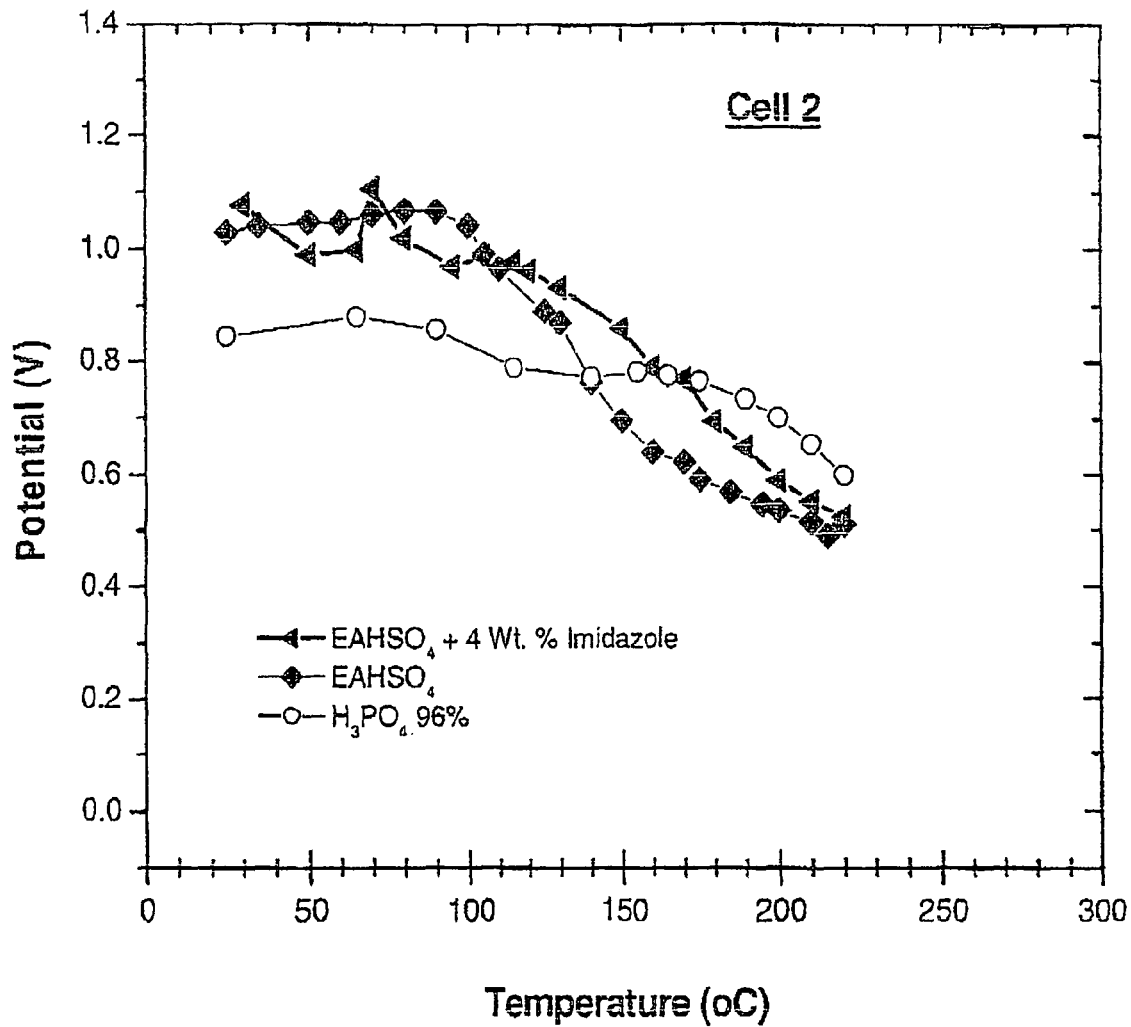

The same phenomenon is found in cells using ethylammonium formate (weaker acid) and ethylammonium hydrogensulfate (stronger acid). Data for ethlammonium hydrogensulfate cell with and without 4 wt % imidazole in cell 2, again using the same flow rates, are shown in FIG. 11. Again the current in the $EAHSO_4$ case is higher despite the more viscous character of the proton transfer electrolyte which is augmented by the imidazole addition. Due to the high viscosity small bubbles no longer form and detach at the frit as in earlier cases and this causes large current fluctuations due to electrode coverage effects. This problem will be amenable to solution by electrode design improvement and by use of mixed electrolytes of different viscosities, it is believed. For the moment the peaks of the current fluctuations are understood as the true indication of cell performance. Note that this is again superior to that of the phosphoric acid cell. It is possible that the imidazole is serving as proton transfer bridge because its proton sites are more accessible at the operating temperature than are the sites on the $HSO_4^-$ species.

Equivalent or superior performance may be obtained using the strong acids $CF_3SO_3H$ and $FSO_3H$, which will yield neutral proton transfer salts like those formed with nitric acid but will be free of explosion hazard. Also to be tested is the mono-protic, unfluorinated, inexpensive, non-toxic acid HBOB which is related to the salt LiBOB first reported by the inventors [W. Xu and C. A. Angell, Electrochem. Solid State Lett., 2001, 4(1), E1-E4]. $BOB^-$ is the bis(oxalato)orthoborate anion. It is a very weakly coordinating anion and the acid is a superacid but it is a large anion and usually has the undesirable effect of increasing liquid and solution viscosities.

Although many exemplary and promising preferred embodiments of this invention have been described, yet to be explored is the behavior of the cells using electrolytes doped with alternative bases, of which a very large number exist, in particular, the aromatic tribasic molecule 1,3,5-triazine $C_3H_3H_3$.

SUMMARY

A new type of fuel cell that employs either a neutral proton transfer salt or an acid salt in which the untransferred protons are only weakly acid has been described. In most cases a liquid at ambient temperature s the electrolyte. The cell appears to have current-voltage performance which is superior to the state of the art phosphoric acid cell and which may be further enhanced by doping the electrolyte with a base that is intermediate in basicity between acid and base components of the primary proton transfer salt. That the electrolyte is not an acid but a neutral salt means that the corrosion problems commonly seen as a major disadvantage with phosphoric acid fuel cells should not arise.

Experimental

The thermal transitions of interest to this work were determined using a simple homebuilt differential thermal analysis DTA unit utilizing the three-terminal system described elsewhere [41]. While extensively used for glass transition and melting point determinations in the past, its utility for the boiling point determinations of primary importance to the present work has previously not been given much attention. DTA has special advantages for the study of corrosive systems because of its use of glass sample tubes and the absence of expensive components in proximity to the samples. In addition the use of unsealed sample containers makes possible the determination of boiling points which are not investigable in standard differential scanning calorimetry DSC instruments.

The liquid protonic acids, trifluoroacetic acid (HTFA, 99%), and dichloroacetic acid (HDCA 99+%), the bases propylamine (PA, 99+%), α-picoline (αPic, i.e. 2-methylpyridine 98%), and methylimidazole (Mim) (99%) were obtained from Aldrich Chemical Co. Anhydrous acetic acid (Hac, 99+%) was obtained from Mallinkrodt and anhydrous formic acid (HFm, 98%) was obtained from Fluka. Anhydrous trifluoromethanesulfonic acid (or triflic acid, HTf, purity unspecified) was obtained from Matrix Scientific. All chemicals were used as received.

The determination of boiling points of liquids and solutions by DTA is very simple [42, 43]. The boiling point has its own distinct signal in DTA. when boiling occurs the rapid growth of bubbles in the slightly superheated liquid combined with the large value of the heat of vaporization causes a sudden absorption of energy. This gives rise to a sharp pen displacement (see FIG. C2). The error due to superheating is minimized by adding a small amount of inert alumina powder to the sample container to promote bubble nucleation.

In pure liquids bubble growth is very rapid. In solutions in which only one component is volatile, bubble growth can be much slower due to the need for diffusion of the volatile component to the bubble surface. The need for diffusion coupled with the higher viscosity of the solutions in which ionic species provide electrostatic constriction leads to less striking, through still obvious, signals in the binary solutions. Weaker signals, particularly near stoichiometric compositions, lead to an increased uncertainty in the boiling point assignment in the intermediate ranges as will be seen in the scatter of binary solution data presented in the next section.

In the case in which the proton transfer energy is greatest (α-picoline+triflic acid, in this study) the activity of the more volatile component (excess acid or excess base) is so reduced that the decomposition point is reached before boiling can be observed. In fact it is estimated that in the absence of decomposition the boiling point for the stoichiometric composition in this case would lie near 450° C.

When decomposition occurs, the direction of the thermal effect changes form endothermic to exothermic for the substances of this study. Reproducibility (precision) of boiling points is better than 1K for the single components. The accuracy and precision can be judged from the results for α-picoline (127 as 127° C. in successive runs, vs. 128° C. (literature value)), and acetic acid 116° C. (literature 118° C.). the increased difference in the second case is attributable to the fact that the reagent was only 98-99% pure.

It would be quite simple to repeat these measurements using an apparatus in which the external pressure is reduced to known values far below ambient and thereby to obtain the liquid/vapor coexistence line (and the heats of vaporization) but this has not been done so far.

A DTA trace showing the sequence of transitions observed in a formic acid+propylamine solution is given in FIG. C2. It shows how the boiling point of the acid is raised from the normal value (100° C.) to 124° C. by incorporation of 10 mol % of the strong base, the boiling point of which is only 53° C. The glass transition is seem at −123° C., increased from that estimated for the pure base, ca. −133° C. the system then crystallizes at −98° C. to yield a solid, the salt propylammonium formate which subsequently re-dissolves at −17° C. There is then a long liquid range up to boiling at 124° C.

Conductivities were measured using dip type cells of cell constant about 0.1 cm$^{-1}$ calibrated with a 0.1 m KCl solution. The cell conductance was determined in the frequency range from 10 Hz to 1 MHz using an automated HP4192 LF frequency analyzer as described many times elsewhere [e.g. 37, 43]. The conductivity was determined from the initial part of the almost frequency-independent plateau (log σ vs. logf plot). Values obtained were checked against the data obtained by short extrapolation to the real axis of the complex impedance plot.

Kinematic viscosities of ionic liquids were measured using Cannon-Ubbelohde viscometers of appropriate viscometer constants in the temperature range between ambient and 130° C. CaCl$_2$ drying-tubes were used to protect the samples from moisture in the air. A uniform temperature environment was provided by a tall, cartridge-heated aluminum temperature-smoothing block with slots to permit meniscus observation. The temperature of the sample was maintained for half an hour before measurement. The precision of measurement with Cannon-Ubbelohde viscometers is controlled by the reproducibility of flow times and accuracy is controlled by accuracy of calibration constants and by temperature measurement. Precision was limited at the highest temperatures (above 100° C.) by the short flow times (<10 s) consequent on our using only a single viscometer for each sample. The flow times were reproducible: the standard deviation was ±0.2 s. For temperatures below 40° C. the run times are often 200 s or longer hence the reading error is only 0.1% of the efflux time. Data were converted to normal viscosities here reported in poise (10 p=1 Pa·x) to maintain the simplicity of the Walden plot (FIG. C1 and the more detailed version given below.)

Results

The temperatures of the various transition points ($T_g$, $T_c$, $T_l$ and $T_b$) obtained from scans like those in FIG. C2 are shown for the case of the system α-picoline+trifluoroacetic acid in FIG. C3.

The inventors note that the glass temperature and liquidus temperature both reach maximum values at the stoichiometry of the simple proton transfer compound α-picolinium trifluoroacetate. On the other hand the boiling point continues to rise with excess acid until the composition 67% acid corresponding to the formation of the di-anion H(TFA)$_s^-$ is reached. Evidently this hydrogen-bonded species has a very high stability in this system. Note that the maximum boiling point (at which the combined vapor pressures of acid and base components equals 1 atm) occurs at the di-anion composition whereas the congruently melting salt has the 1:1 single proton transfer stoichiometry.

FIG. C4 shows the boiling points of several binary systems in which the strength of the acid is increased while the base α-picoline is kept common to each. In the case of the strongest acid of the study, triflic acid, the boiling point lies above the decomposition temperature of the aromatic base. An extrapolation of the data obtained for compositions where boiling occurred before decomposition (solid symbols) suggests near the 1:1 composition, the vapor pressure of acid or base species would be very low, even at 250° C. The open triangle at the 1:1 stoichiometry is the value predicted using the correlation obtained in a later figure. Prior decomposition presents direct measurements.

FIG. C5 contains data analogous to those of FIG. 4 for the case in which the stronger non-aromatic base n-propylamine is used as the common component. In this case even formic acid yields a proton transfer salt with a boiling point elevation of some 100K above the additive value.

Data on the conductivities of the systems of FIG. C4 are shown in FIG. C6 and viscosity data are shown in FIG. C7. Conductivity and viscosity data for the remaining systems are available but are subsumed into the more economic form of FIG. C1 and presented in the Discussion section. The data have been reduced to Vogel-Fulcher-Tanumann equation parameters presented in Table 1. These are valid only in the range of the data. Finally, data for the densities that are needed to convert specific conductivities into equivalent conductivities are summarized by the linear equations given in Table 2.

TABLE 1

Rogel-Fulcher-Tamman (VFT) equation parameters of viscosity data for α-picolinium salts

| | $\eta_o$/cP | D | $T_o$/K | $T_g$/K | $R^2$ |
|---|---|---|---|---|---|
| α Pic-Fm | 0.04 | 7.66 | 103 | 154 | 0.999 |
| α Pic-TFA | 0.14 | 3.11 | 187 | 196 | 0.999 |
| α Pic-Tf | 0.16 | 4.09 | 181 | unavailable | 0.999 |

Note:
VFT equation $\eta = \eta_o \exp[Dt_o/(T - T_o)]$

TABLE 2

Linear density equations for α-picolinium salts

| | p/gcm$^{-3}$ (t in ° C.) |
|---|---|
| α Pic-Fm | 1.05 − 4.39 × 10$^{-4}$ t |
| α Pic-TFA | 1.31 − 5.26 × 10$^{-4}$ t |
| α Pic-Tf | 1.46 − 7.16 × 10$^{-4}$ t |

Discussion

1. Proton Transfer Salts

The data of FIGS. C4 and C5 provide an opportunity to quantify what would be expected from the concept of acid-base processes. The inventors expect that the activities of the individual components will be lowered from the ideal solution values very strongly when there is a large driving force to transfer the proton from acid to base thereby forming the salt. In aqueous solutions the free energy driving the transfer may be obtained from data on the work of transfer of protons from acid to water and from water to base respectively. These are extensively catalogued in terms of the $pK_a$ values and $pK_b$ values. For a given substance acting alternatively as an acid or as a base, these are related by $pK_a + pK_b = 14$. The value 14 is determined by the properties of the solvent water and is the base 10 logarithm of its auto-dissociation constant $pK_w$. The $pK_w$ is related to the work ($-RT\ln K_w$) of transferring a proton from one water molecule to a distant one within the solution medium provided by water itself, as has been described in great detail in the book by Gurney [24]. The sum of $pK_a$ and $pK_b$ for the acid and base that form the anion and cation of a given salt allow us to obtain a measure of the free energy of formation of the salt from its ions in the dilute aqueous solution $\Delta G = -RT$ in $(\Delta pKa)$.

It is of interest to see if the wealth of information available for these interactions in aqueous solutions has any relevance to the behavior of the same acids and bases interacting in the absence of water or of any other solvent. The dielectric constant of water through which the transfer of the proton in aqueous systems occurs is very large, about 80. The work of transfer to restore the original molecular acid and base components from the salt should therefore be much greater in the absence of any dielectric particularly a medium with the dielectric constant of water. Thus the driving force for salt formation in the systems studied could be very different from that measured in water. Whether any correlations can survive such a drastic change of proton transfer environment can only be determined by experiment.

The possibility of correlation is tested first by comparing the increases in boiling point over the additive values for each base/acid pair studied (FIGS. C4 and C5) as a function of the difference in $pK_a$ values of the acid and base components in water [44]. The inventors use $pK_a = 14 - pK_b$ values for the base when only $pK_b$ values have been tabulated. The $pK_a$ values for the individual components are given in the figure legends.

FIG. C8 illustrates the correlation of the excess boiling point (determined at the 1:1 composition) with the difference in aqueous solution $pK_a$ values for the component Bronsted acids and bases of the respective ionic liquids. The $\Delta T_b$ value is determined as the difference between the measured boiling point and the value at 1:1 of the linear connection between pure acid and pure base boiling points. Note the very large excess boiling points extrapolated for the ionic liquids formed from the superacid HTf (open triangles). These values could not be determined experimentally because of prior decomposition.

FIG. C8 uses data for all acid/base combinations studied in this work for which the boiling points at 1:1 acid:base fall below any decomposition temperature. It is seen that four points fall precisely on the same line within the uncertainty of determination while a fifth (for the case in which the difference in boiling point of acid and base components is the largest, hence the additive baseline the most dubious) falls close to the line. As noted already for the case in which the value of $\Delta pK_a$ is largest involving the strongest acid of all, the boiling point falls above the decomposition temperature as indeed the correlation plot FIG. C8 would predict. If we use the plot to estimate the un-measurable boiling point it seems compatible with the extrapolations of the two arms of the solution boiling points measured on either side of the stoichiometric ratio. These suggest that in the absence of decomposition boiling would not occur before 450° C. Clearly the salt of α-picolinium triflate should be regarded unequivocally as an ionic liquid.

Turning to another measure the inventors examine the conductivity of the ionic liquid formed by the proton transfer relative to its fluidity as in FIG. C1. It is recalled that the ideal line is obtained on the basis that ions have mobilities that are determined only by the viscosity of the medium and that the number of ions present in the equivalent volume is that indicated by salt composition (i.e. all ions contribute equally) [21, 45]. The ideal line position is fixed from dilute solution data where the ions are remote from one another and the Stokes-Einstein and Nernst-Einstein relations are well obeyed. Due to the inevitability of inter-ionic friction in an ionic liquid some degree of departure must be expected. The deviations from the Nernst-Einstein equation predicted by theory [46] will cause experimental points to fall below the dilute solution limit. The closer to the ideal line the data for a given salt is found to lie, the more ideal it may be considered.

After conversion of the specific conductivity σ data of FIG. C4 to equivalent conductivities Λ and the kinematic viscosity ν data (in centistokes) of FIG. C5 to dynamic viscosity η data (in centipoise), using $\Lambda = V_e \sigma$ and $\eta = \nu \rho$. Where $V_e$ is the equivalent volume and ρ is the density, the data for the two series of salts (formed at 1:1 stoichiometry) are plotted in FIG. C9.

Again one sees that in a given series with common base the salts with the largest difference in aqueous solution $pK_a$ values, propylammonium trifluoroacetate and α-picilinium triflate, are the ones that conform most closely to the Walden rule with ideal $\Lambda/\eta^{-1}$ value. Indeed they lie significantly closer to the ideal line than do that data for one of the collection of aprotic salts recently described [37, 47] the tetrafluoroborate salt of a quaternary ammonium salt. Based on its aprotic character this salt would be expected to yield a more typical ionic liquid than the proton transfer salts.

FIG. C10 shows deviations from the "ideal" Walden behavior for ionic liquids plotted against $\Delta pK_a$ values for the component Bronsted acids and bases of the respective ionic liquids. Clearly case with small $pK_a$ values cannot be classed as ionic liquids. When $\Delta pK_a$ is greater than ca. 10 no difference can be observed between proton transfer ionic liquids and aprotic ionic liquids by their transport behavior.

The inventors test the Walden ideality relation more quantitatively in FIG. C10. There they plot the interval between the experimental Walden plot for each liquid and the ideal line, $\Delta W$ measured at a fixed value of $\log \eta^{-1}$ against the differences in aqueous solution acid and base $\Delta pK_a$ values, as used in FIG. C18. Here again a surprisingly good (inverse) correlation is found. FIG. C9 and FIG. C10 together show that when the aqueous $\Delta pK_a$ value is greater than about 10 the difference between the positions of the Walden plot for the proton transfer salt and for salts where proton transfer is not a possibility has vanished.

Above, the inventors have made successful correlations of the salt-like character of proton transfer salts at two rather different temperatures—the boiling point in the first instance (in FIG. C8) and a midrange isoviscous point in the second (FIG. C10. There remains the evaluation at low temperatures that can be made tentatively in terms of the excess glass temperatures $\Delta T_g$. $\Delta T g$ like $\Delta T_b$ is assessed as the difference between the measured $T_g$ at the stoichiometric salt composition and the additive value at the same composition. The excess $T_g$ is shown as a function of $\Delta pK_a$ in FIG. C11. It is subject to much larger scatter than the others implying that other important factors enter into the determination of the glass temperature as is known from earlier work.

Comparable increases in Tg due to proton transfer 57K were reported long ago for the case of hydrozine (8.1)+formic acid (3.75) [48] for which $\Delta pK_a$ is 4.35. The conductivity of the 1:1 solution in this system (which is liquid at 35° C. but does not exist as a distinct crystalline solid) is the highest ever measured for an ionic liquid [20, 49] probably due to the very low value of Tg for this case (−115° C. [48].

2. Thermodynamics of Ionic Liquid Formation

From the comparisons in FIGS. C8 and C9 it can be seen that the Walden rule criterion is less discriminating between ionic liquids formed by proton transfer than the vapor pressure criterion. Two liquids that appear equally ionic by the Walden rule criterion can be distinguished one from the other by the boiling point elevation criterion. This section discusses briefly the thermodynamic reason for this distinction and notes that it also provides a basis for distinguishing aprotic from protic salts.

The ionic liquid can be thought of as the result of a proton "falling" from a quantized energy level on the acid molecule (called an "occupied" level after Gurney ([24]) into a previously unoccupied or "vacant" level (also quantized) on the base to form the protonated cationic species as illustrated in FIG. C12.

In FIG. C12 free energy levels G for protons on acid/conjugate base pairs follow Gurney [24]. The gap between levels measures the free energy of proton transfer at the stoichiometric composition. The larger the gap the smaller the Boltzmann probability of reformation of the original molecular pair at any given temperature, hence the smaller the vapor pressure over the ionic liquid at ambient pressure. At the boiling point the sum of the two molecular partial pressures reaches 1 atm.

The fact that the reverse proton transfer can yield two new species within the ionic liquid provides a thermodynamic (entropic) drive to generate vapor. This must ultimately win out as temperature increases because of the T$\Delta$S component of the total free energy change. The question is only whether the boiling point (at which the sum of the two molecular partial pressures reaches 1 atm.) will be reached before decomposition renders it irrelevant. The equilibrium involved in the boiling is of the simple "two-state" variety, and should be preceded by a rise in heat capacity. The excess heat capacity of a two-state system is given by $\Delta C_p = R(\Delta H/RT)^2 X(1-X)$ where X is the fraction of protons that have been excited into high energy sites at temperature T and $\Delta H$ is the enthalpic component of the free energy gap. X itself depends on both the enthalpy and entropy terms in the free energy of proton transfer represented in FIG. 12 by the free energy gap between the two levels. whether or not the rise in heat capacity will be easily detected will depend on the value of the $\Delta S$ itself is determined largely by differences in vibration frequencies in the molecules and ions and in the liquid quasi-lattice when the proton transfer occurs. Generally this heat capacity increase will occur over too wide a temperature range to be detected without quantitative heat capacity measurements.

For aprotic ionic liquids the corresponding exchange between anion and cation species would involve the transfer of alkyl groups like —$CH_3$ and —$C_2H_5$ rather than protons. This is a much more energetic process which is usually preempted by other decomposition modes.

3. High Temperature Protonic Acids

A potentially important aspect of this study concerns the demonstrated general existence of high-temperature-stable, proton-rich, ionic liquids. Firstly it is noted that the stabilization of proton-carrying dianions in the presence of weak field cations has been reported before. The existence of $HCl_2^-$ as a stable anionic species with lifetime long with respect to the NMR time scale was demonstrated spectroscopically in some of the early ionic liquid work [50]. More recently the difluoride anion which is well known in inorganic chemistry has been the subject of several ionic liquid studies [51, 52]. In principle such anions could serve as the proton-transporting media in high temperature fuel cells. The stability of di-anion stoichiometries is best seen in FIG. C4 in which the maximum boiling point is exhibited not at the 1:1 composition but at the 2:1 acid:base composition. The stability of the $AHA^-$ anion derives from the existence of a strong hydrogen bond between the anion and the additional molecule of acid. This bond is strong enough in the case of $HF_2^-$ that the anion forms even in the presence of alkali cations. With anions less electronegative than $F^-$ the bond can form only when the cation exerts too weak an electric field to control the anion orientation.

In future work the inventors intend to characterize these species by their proton NMR spectra and their O—H vibration frequencies. For the moment the inventors comment on the properties of the solutions containing them and the properties they exhibit relative to those of the stoichiometric salt compositions.

In FIG. C13 is shown the conductivities of the solutions of two of these systems. FIG. 13 plots conductivity isotherms for binary solutions of the two acid-base pairs showing conductivity minima at the stoichiometric compositions at which the glass temperatures maximize (see FIG. C3). High conductivities are realized in acid and base-rich compositions until decreasing ionic concentrations become dominant. Both systems have the same base, $\alpha$-picoline, but the acids differ greatly in strength. In one case trifluoracetic acid, the $\Delta pK_3$ value is 7.3 units and the boiling point at the 1:1 stoichiometry is easily measured, 175° C. In the second case triflic acid, the $\Delta pK_a$ value is ca. 20 and the boiling point cannot be observed. The conductivities however are not so different because although the ionicity of the triflate salt is high in consequence of its stronger proton transfer the concomitantly higher $T_g$ renders the ion mobilities smaller. The former is evidently the most important because the triflate salt has the higher conductivity. Since it also has the lower vapor pressure it is of the two the ionic liquid of preference if conductivity is an important consideration. However, if fluidity should be an important consideration, the trifluoroacetate IL may be the more desirable medium.

GLOSSARY

| | GLOSSARY |
|---|---|
| BMI | 1-n butyl-3-methylimidazolium |
| DMAN | dimethylammonium nitrate |
| EA | ethylammonium |
| EAN | ethylammonium nitrate |
| $EAH_2PO_4$ | ethylammonium dihydrogenphosphate |
| $EAHSO_4$ | ethylammonium hydrogensulfate |
| EMI | 1-ethyl-3-methylimidazolium |
| Fm | formate |
| HOEA | hydroxyethylammonium |
| HOEAN | hydroxyethylammonium nitrate |
| HTFAc | trifluoroacetic acid |
| MA | methylammonium |
| MAN | methylammonium nitrate |
| $MOENM_2E$ | methoxyethyl dimethyl ethyl ammonium |
| $MOMNM_2E$ | methoxymethyl dimethyl ethyl ammonium |
| MOPA | methoxypropylammonium |
| $\alpha$ Pci | $\alpha$-picoline |
| TFAc | trifluoroacetate |
| TFSI | bis(trifluoromethanesulfonyl)imide |
| $T_b$ | boiling point |
| $T_c$ | temperature of devitrification |
| $T_{dec}$ | thermal decomposition temperature |
| $T_g$ | glass transition temperature |
| $T_l$ | liquidus temperature |

REFERENCES

1. Arrhenius, S., *Z. Phys. Chem.* 1, 631 (1887).
2. Barthel, J. et al., in *Top. Curr. Chem.* 111, 33 (1983).
3. Barthel, J., Gores, H. J., Neueder, R., Schmid, A., *Pure Appl. Chem.* 71, 1705 (1999).

4. Rogers, R. D., Seddon, K. R., Eds. *Ionic Liquids: Industrial Applications to Green Chemistry*, ACS Symposium Series 818 (American Chemical Society, 2002).
5. Rogers, R. D., Seddon, K. R., Volkov, S., Eds. *Green Industrial Applications of Ionic Liquids*, NATO Sci. Ser., II, 92 (2003) (Kluwer Academic Publishers, Dordrecht, Neth., 2003).
6. Carlin, R. T., Wilkes, J. S. in *Chemistry of Nonaqueous Solutions-Current Progress*, G. Mamantov, A. I. Popov, Eds. (VCH, New York, 1994), pp. 277-306.
7. Sun, J., Forsyth, M., MacFarlane, D. R., *J. Phys. Chem.* B 102, 8858 (1998).
8. Papagiorgiou, N. et al., *J. Electrochem. Soc.* 143, 3099 (1996).
9. Fuller, J., Carlin, R. T., Osteryoung, R. A., *J. Electrochein. Soc.* 144, 3881 (1997).
10. Yoshizawa, M., Ogihara, W., Ohno, H., *Electrochem. Solid-State Lett.* 4, E25 (2001).
11. Lu, W. et al., *Science* 297, 983 (Aug. 9, 2002).
12. Xu, W., Cooper, E. E., Angell, C. A., *J. Phys. Chem. B* 107, 6170 (2003).
13. Yoshizawa, M., Xu, W., Angell, C. A., "Ionic liquids by proton transfer: vapor pressure and conductivity, and the relevance of $\Delta pK_a$ from aqueous solutions," *J. Am. Chem. Soc.* 125, 13411-15419 (2003).
14. Angell, C. A., Xu, W., Yoshizawa, M., Hayashi, A. Belieres, J.-P., in *Ionic Liquids: The Front and Future of Material Development*, Ed., Ohno, H. High Tech. Info., Tokyo, 2003, pp. 43-55 (in Japanese) (English version is available from the corresponding author upon request).
15. Angell, C. A., 267, 1924 (1995).
16. Walden, P. *Bull. Acad. Imper. Sci.* (St. Petersburg) 1914, 1800.
17. Evans, D. F., Yamauchi, A., Roman, R. Casassa, E. Z., *J. Col. Interface Sci.* 88, 69 (1982).
18. Bressle, R. D., Ph.D. Thesis, Purdue University (1972).
19. Xu, W., Angell, C. A., *Electrochem. Solid-State Lett.* 4, E1 (2001).
20. Suffer, J., Ph.D. Thesis, Purdue University, 1971, and *J. Phys. Chem.*, 75, 1826 (1971).
21. Walden, P. Z., *Physik Chem.*, 1906, 55, 207 and 246.
22. Angell, C. A., *Solid State Ionics*, 1983, 9 & 10, 3.
23. Bernal, J., Fowler, R. E., *J. Chem. Phys.*, 1933, 1, 515.
24. Gurney, R. W., *Ionic Processes in Solution*, (McGraw-Hill, New York, 1953).
25. Angell, C. A., Xu, W., Yoshizawa, M., Belieres, J.-P., in *Proceedings of the International Symposium on Ionic Liquids in Honour of Marcelle Gaune-Escard* (Carry le Rouet, France, June 26-28, 2003), H. A. Oye, A. Jagtoyen, Eds. (Dept. of Materials Technology, The Norwegian University of Science and Technology, Trondheim, Norway, 2003), pp. 389-398.
26. Hagiwara, R., Hirashige, T., Tsuda, T., Ito, Y., *J. Electrochem. Soc.* 149, D1 (2002).
27. Robinson, R. A., Stokes, R. H., *Electrolyte Solutions* (Butterworths, London, ed. 2, revised, 1959), p. 465 Appendix 6.2.
28. Noda, A., Susan, B. H. A., Mitsushima, K., Shigenori, H., Kikuko, H., Watanabe, M., *J. Phys. Chem. B* 107, 4024 (2003).
29. Klein, N. in Proc. of the 19th JANNAF Combustion Meeting, vol. 1, CPIA Publ. 366, 1982, p. 513, Chemical Propulsion Information Agency, Laurel, Md.
30. Messina, N. A. et al., in Proc. of the 21th JANNAF Propulsion Meeting vol. 1, CPIA Publ. 412, 1984, p. 515.
31. Lee, Y. T., Schroeder, J., Doi, C. S., Frankel, J., *J. Chem. Phys.* 1990, 92, 3283.
32. (a) Bowles, C. J., Bruce, D. W., Seddon, K. R., Chem. Commun. 1996, 1625. (b) Holbrey, J. D., Seddon, K. R., *J. Chem Soc., Dalton Trans.* 1999, 2133.
33. Welton, T., *Chem. Rev.* 1999, 99, 2071.
34. Forsyth, S. A., MacFarlane, D. R., Thomson, R. J., von Itzstein, M., *Chem. Commun.* 2002, 714.
35. Wasserscheid, P., Welston, T. Eds., *Ionic liquids in synthesis*, Wiley-VCH, 2003.
36. Hirao, M., Sugimoto, H., Ohno, H., *J. Electrochem. Soc.* 2000, 147, 4168.
37. Xu, W., Cooper, E. I., Angell, C. A., *J. Phys. Chem. B.* (in press).
38. Angell, C. A. in *Molten salts: From fundamentals to applications*, Ed., Gaune-Escarde, M.; NATO-ASI: Kluwer Scientic, Delft, 2001.
39. McLin, M., Angell, C. A., *J. Phys. Chem.*, 1988, 92, 2083.
40. Lucas, P., Videa, M., Angell, C. A., *J. Phys. Chem.* (in preparation).
41. Angell, C. A., Sare, E. J., *J. Chem. Phys.* 1970, 52, 1058.
42. Sivaraman, A., Senapati, H., Angell, C. A., *J. Phys. Chem. B,* 1999, 103, 4159.
43. Velikov, V., Senapati, H., Angell, C. A. U.S. Pat. No. 6,155,075, 2000.
44. The $pK_a$ values were taken from (a) Covington, A. K., Davison, W., *CRC Handbook of Chemistry and Physics*, 75th ed., Editor-in-chief, Lide, D. R. Chemical Rubber Co. Press, Boston, p. 8-43; and (b) *Lange's Handbook of Chemistry*, 13th ed., Ed. Dean, J. A. McGraw-Hill, Inc., New York, p. 5-18. For the case of triflic acid, we adopted the $pK_a$ value-14 suggested by Ripin, D., Evans, D. (see http://daecr1.harvard.edu/pKa/pKa.html).
45. Bockris, J. O'M, Reddy, A. K. N., *Modern Electrochemistry*, 2nd ed., Plenum Press, New York 1998.
46. Berne, B., Rice, S. A., *J. Chem. Phys.* 1964, 40, 1347.
47. Cooper, E. I., Angell, C. A., *Solid State Ionics* 1983, 9 & 10, 617.
48. Sutter, E. J., Angell, C. A., *J. Phys. Chem.* 1971, 75, 1826.
49. Sutter, J., Harrison, A., Angell, C. A. (to be published).
50. Shuppert, J. W., Angell, C. A., *J. Chem. Phys.* 1977, 67, 3050.
51. Tsuda, T., Nohira, T., Nakamori, Y., Matsumoto, K., Higawara, R., Ito, Y., *Solid State Ionics* 2002, 149, 295.
52. Matsumoto, H., Matsuda, T., Tsuda, T., Hagiwara, R., Ito, Y., Miyazaki, Y., *Chem. Lett.* 2001, 26.
53. Xu, W., Angell, C. A., "Solvent-Free Electrolytes with Aqueous Solution-like Conductivities," *Science,* 302, 422-425 (2003).
54. Xu, W., Angell, C. A., (to be published).
55. Kvist, A., Lunden, A., *Z Naturforsch.*, 20, 235 (1965).
56. Lunden, A., Bengtzelius, A., Kaber, R., Nilsson, L., Schroeder, K., Tärneberg, T., *Solid State Ionics,* 9/10, 89 (1983).
57. Borjesson, L., Torell, L. M., *J. Chem. Phys.*, 32, 2471 (1985).
58. Boysen, D. A., Chisholm, C. R. I., Haile, S. M., Narayanan, S. R., *J. Electrochem. Soc.,* 147(10), 3610 (2000).
59. Brown, R. N., McLaren, A. C., "On the mechanism of the thermal transformations in solid ammonium nitrate," *Proc. Roy. Soc.,* 266, 329-343, (1962).
60. Ishida, H., Ikeda, R., Nakamura, D., "Self-diffusion of methylammonium cations in the high temperature solid phase of $CH_3NH_3NO_3$," (1885)
61. Belieres, J.-P., Yoshizawa, M., Xu, W., Angell, C. A., "Ionic Liquids as Non-corrosive high temperature fuel cell electrolytes," *Science* (to be submitted). (Abstract No. 83)

of Symposium on Ionic Liquids ("Novel Applications" sessions) at the Am. Chem. Soc. Fall meeting, New York, Sep. 7-11, 2003.

62. (a) Neergat, M., Shukla, A. K., "A high performance phosphoric acid fuel cell," *J. Power Sources,* 102, 317-321 (2001). (b) Caires, M. I., Buzzo, E. A., Ticianelli, E. R., Gonzalez, E. R., *J. Appl. Electrochem.,* 27, 19 (1997).

We claim:

1. A fuel cell having at least two electrodes and an electrolyte having at least one constituent comprising at least one proton transfer salt, wherein the at least one proton transfer salt comprises dimethylammonium nitrate.

2. The fuel cell according to claim 1, wherein the at least one proton transfer salt further comprises ethylammonium nitrate.

3. A fuel cell having at least two electrodes and an electrolyte having at least one constituent comprising at least one proton transfer salt, wherein the at least one proton transfer salt comprises ethylammonium formate.

4. The fuel cell according to claim 1, wherein at least a constituent of the electrolyte is a bisulfate.

5. The fuel cell according to claim 1, wherein the electrolyte further includes a minor constituent that is an involatile base of $pK_3$ value intermediate between those of an acid and a base making up the salt.

6. A fuel cell having at least two electrodes and an electrolyte having at least one constituent comprising at least one proton transfer salt, wherein the at least one constituent is ethylammonium hydrogensulfate doped with an involatile base.

7. The fuel cell according to claim 6, wherein the base is imidazole.

8. The fuel cell according to claim 1, wherein the at least one constituent further comprises ethylammonium nitrate doped with an involatile base.

9. The fuel cell according to claim 8, wherein the base is imidazole.

10. The fuel cell according to claim 1, wherein the electrolyte is substantially free of solvent.

11. The fuel cell according to claim 1, wherein the at least one proton transfer salt further comprises a neutral salt.

12. The fuel cell according to claim 1, wherein the at least one proton transfer salt further comprises one of a dianionic ionic liquid and a normal ionic liquid.

* * * * *

UNITED STATES PATENT AND TRADEMARK OFFICE
CERTIFICATE OF CORRECTION

| | | |
|---|---|---|
| PATENT NO. | : 7,867,658 B2 | Page 1 of 1 |
| APPLICATION NO. | : 10/555468 | |
| DATED | : January 11, 2011 | |
| INVENTOR(S) | : C. Austen Angell | |

It is certified that error appears in the above-identified patent and that said Letters Patent is hereby corrected as shown below:

ON THE TITLE PAGE:

Column 2 (FOREIGN PATENT DOCUMENTS), delete "JP 2003123791 4/2003".

Column 2 (FOREIGN PATENT DOCUMENTS), delete "WO WO02063073 8/2002".

Signed and Sealed this
Twenty-second Day of March, 2011

David J. Kappos
*Director of the United States Patent and Trademark Office*